(12) United States Patent
Hu et al.

(10) Patent No.: US 10,496,045 B2
(45) Date of Patent: Dec. 3, 2019

(54) FALL PROTECTION EQUIPMENT EVENT GENERATION AND MONITORING

(71) Applicant: 3M INNOVATIVE PROPERTIES COMPANY, St. Paul, MN (US)

(72) Inventors: Jia Hu, Mounds View, MN (US); Matthew J. Blackford, Hastings, MN (US); Keith G. Mattson, Woodbury, MN (US); Ronald D. Jesme, Plymouth, MN (US); Nathan J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/782,645

(22) Filed: Oct. 12, 2017

(65) Prior Publication Data

US 2018/0107169 A1    Apr. 19, 2018

Related U.S. Application Data

(60) Provisional application No. 62/408,442, filed on Oct. 14, 2016.

(51) Int. Cl.
*G05B 9/02* (2006.01)
*A62B 35/00* (2006.01)
(Continued)

(52) U.S. Cl.
CPC ............ *G05B 9/02* (2013.01); *A62B 35/0043* (2013.01); *A62B 35/0093* (2013.01); *G05B 6/02* (2013.01); *G05B 17/02* (2013.01)

(58) Field of Classification Search
None
See application file for complete search history.

(56) References Cited

U.S. PATENT DOCUMENTS

| 8,490,751 B2 | 7/2013 | Allington |
| 2012/0217091 A1 | 8/2012 | Baillargeon |

(Continued)

FOREIGN PATENT DOCUMENTS

| JP | 2002-336367 | 11/2002 |
| JP | 2009-165517 | 7/2009 |

(Continued)

OTHER PUBLICATIONS

"DC 5.9V 28mm Base Car VCD DVD Player Spindle Motor w Trayer Holder", [On line] [Retrieved on Nov. 22, 2017], URL <http://www.uxcell.com/59v-28mm-base-car-vcd-dvd-player-spindle-motor-trayer-holder-p-253738.html>, pp. 1-2.

(Continued)

*Primary Examiner* — Brian W Wathen
*Assistant Examiner* — Hung H Dang
(74) *Attorney, Agent, or Firm* — Christopher D. Karlen

(57) ABSTRACT

In some examples, a system includes a self-retracting lifeline (SRL) comprising one or more electronic sensors, the one or more electronic sensors configured to generate data that is indicative of an operation of the SRL; and at least one computing device comprising one or more computer processors and a memory comprising instructions that when executed by the one or more computer processors cause the one or more computer processors to: receive the data that is indicative of the operation of the SRL; apply the data to a safety model that predicts a likelihood of an occurrence of a safety event associated with the SRL; and perform one or more operations based at least in part on the likelihood of the occurrence of the safety event.

25 Claims, 8 Drawing Sheets

(51) Int. Cl.
    *G05B 6/02*     (2006.01)
    *G05B 17/02*    (2006.01)

(56) References Cited

U.S. PATENT DOCUMENTS

| | | | |
|---|---|---|---|
| 2015/0027808 A1 | 1/2015 | Baillargeon | |
| 2016/0107007 A1 | 4/2016 | Pollard | |
| 2016/0210838 A1 | 7/2016 | Yan et al. | |
| 2016/0292988 A1* | 10/2016 | McCleary | G08B 21/14 |
| 2017/0368387 A1* | 12/2017 | Fife | A62B 35/0075 |

FOREIGN PATENT DOCUMENTS

| | | | |
|---|---|---|---|
| WO | 2016/176301 | 11/2016 | |
| WO | WO 2016176301 A2 * | 11/2016 | A62B 35/0075 |

OTHER PUBLICATIONS

"Harnessing Ambient Energy to Detect Motion and Save Power", [On line] [Retrieved on Nov. 22, 2017], URL <http://www.digikey.com/en/articles/techzone/2013/may/harnessing-ambient-energy-to-detect-motion-and-save-power>, pp. 1-4.

\* cited by examiner

FALL PROTECTION EQUIPMENT EVENT GENERATION AND MONITORING

TECHNICAL FIELD

This disclosure relates to safety equipment and, in particular, fall protection equipment.

BACKGROUND

Fall protection equipment is important safety equipment for workers operating at potentially harmful or even deadly heights. For example, to help ensure safety in the event of a fall, workers often wear safety harnesses connected to support structures with fall protection equipment such as lanyards, energy absorbers, self-retracting lifelines (SRLs), descenders, and the like. An SRL typically includes a lifeline that is wound about a biased drum rotatably connected to a housing. Movement of the lifeline causes the drum to rotate as the lifeline is extended out from and retracted into the housing. Examples of self-retracting lifelines include the ULTRA-LOK self-retracting lifeline, the NANO-LOK self-retracting lifeline, and the REBEL self-retracting lifeline manufactured by 3M Fall Protection Business.

SUMMARY

In general, this disclosure describes techniques for monitoring and predicting safety events for fall protection equipment, such as SRLs. In some examples, a safety event may refer to activities of a user of personal protective equipment (PPE), a condition of the PPE, or a hazardous environmental condition. For example, in the context of fall protection equipment, a safety event may be misuse of the fall protection equipment, a user of the fall equipment experiencing a fall, or a failure of the fall protection equipment. In the context of a respirator, a safety event may be misuse of the respirator, a user of the respirator not receiving an appropriate quality and/or quantity of air, or failure of the respirator. A safety event may also be associated with a hazard in the environment in which the PPE is located.

According to aspects of this disclosure, SRLs may be configured to incorporate one or more electronic sensors for capturing data that is indicative of operation of the SRL, location of the SRL, or environmental conditions surrounding the SRL. In some instances, the electronic sensors may be configured to measure length, speed, acceleration, force, or a variety of other characteristics associated with a lifeline of an SRL, the location of the SRL, and/or environmental factors associated with an environment in which the SRL is located, generally referred to herein as usage data or acquired sensor data. SRLs may be configured to transmit the usage data to a management system configured to execute an analytics engine that applies the usage data (or at least a subset of the usage data) to a safety model to predict a likelihood of an occurrence of a safety event associated with an SRL in real-time or near real-time as a user (e.g., a worker) engages in activities while wearing the SRL. In this way, the techniques may provide tools to accurately measure and/or monitor operation of an SRL, determine predictive outcomes based on the operation and generate alerts, models or rule sets that may be employed to warn the potential of or even avoid, in real-time or pseudo real-time, imminent safety events.

In some examples, a system includes: a self-retracting lifeline (SRL) comprising one or more electronic sensors, the one or more electronic sensors configured to generate data that is indicative of an operation of the SRL; and at least one computing device comprising one or more computer processors and a memory comprising instructions that when executed by the one or more computer processors cause the one or more computer processors to: receive the data that is indicative of the operation of the SRL; apply the data to a safety model that predicts a likelihood of an occurrence of a safety event associated with the SRL; and perform one or more operations based at least in part on the likelihood of the occurrence of the safety event.

In some examples, a self-retracting lifeline includes: a first connector configured to be coupled to an anchor; a second connector configured to be coupled to a user of the lifeline; and one or more electronic sensors, the one or more electronic sensors configured to generate usage data that is indicative of an operation of the SRL.

In some examples, a computing device includes: one or more computer processors; and a memory comprising instructions that when executed by the one or more computer processors cause the one or more computer processors to: obtain usage data from at least one self-retracting lifeline (SRL), wherein the usage data comprises data indicative of operation of the at least one SRL; apply the usage data to a safety model that characterizes activity of a user of the at least one SRL; predict a likelihood of an occurrence of a safety event associated with the at least one SRL based on application of the usage data to the safety model; and generate an output in response to predicting the likelihood of the occurrence of the safety event.

The details of one or more examples of the disclosure are set forth in the accompanying drawings and the description below. Other features, objects, and advantages of the disclosure will be apparent from the description and drawings, and from the claims.

DETAILED DESCRIPTION

According to aspects of this disclosure, an SRL may be configured to incorporate one or more electronic sensors for capturing data that is indicative of operation, location, or environmental conditions surrounding the SRL. Such data may generally be referred to herein as usage data or, alternatively, sensor data. Usage data may take the form of a stream of samples over a period of time. In some instances, the electronic sensors may be configured to measure length, speed, acceleration, force, or a variety of other characteristics associated with a lifeline of an SRL, positional information indicative of the location of the SRL, and/or environmental factors associated with an environment in which the SRL is located. Moreover, as described herein, an SRL may be configured to include one or more electronic components for outputting communication to the respective worker, such as speakers, vibration devices, LEDs, buzzers or other devices for outputting alerts, audio messages, sounds, indicators and the like.

According to aspects of this disclosure, SRLs may be configured to transmit the acquired usage data to a personal protection equipment management system (PPEMS), which may be a cloud-based system having an analytics engine configured to process streams of incoming usage data from SRLs or other personal protection equipment deployed and used by a population of workers at various work environments. The analytics engine of the PPEMS may apply one or more models to the streams of incoming usage data (or at least a subset of the usage data) to monitor and predict the likelihood of an occurrence of a safety event for the worker associated with any individual SRL. For example, the analytics engine may compare measured parameters (e.g., as measured by the electronic sensors) to known models that characterize activity of a user of an SRL, e.g., that represent safe activities, unsafe activities, or activities of concern (which may typically occur prior to unsafe activities) in order to determine the probability of an event occurring.

The analytics engine then may generate an output in response to predicting the likelihood of the occurrence of a safety event. For example, the analytics engine may generate an output that indicates a safety event is likely to occur based on data collected from a user of an SRL. The output may be used to alert the user of the SRL that a safety event is likely to occur, allowing the user to modify or adjust their behavior. In other examples, circuitry embedded within the SRLs or processors within intermediate data hubs more local to the workers may be programmed via the PPEMS or other mechanism to apply models or rule sets determined by the PPEMS so as to locally generate and output alerts or other preventative measure designed to avoid or mitigate a predicted safety event. In this way, the techniques provide tools to accurately measure and/or monitor operation of an SRL and determine predictive outcomes based on the operation.

Figure 1:
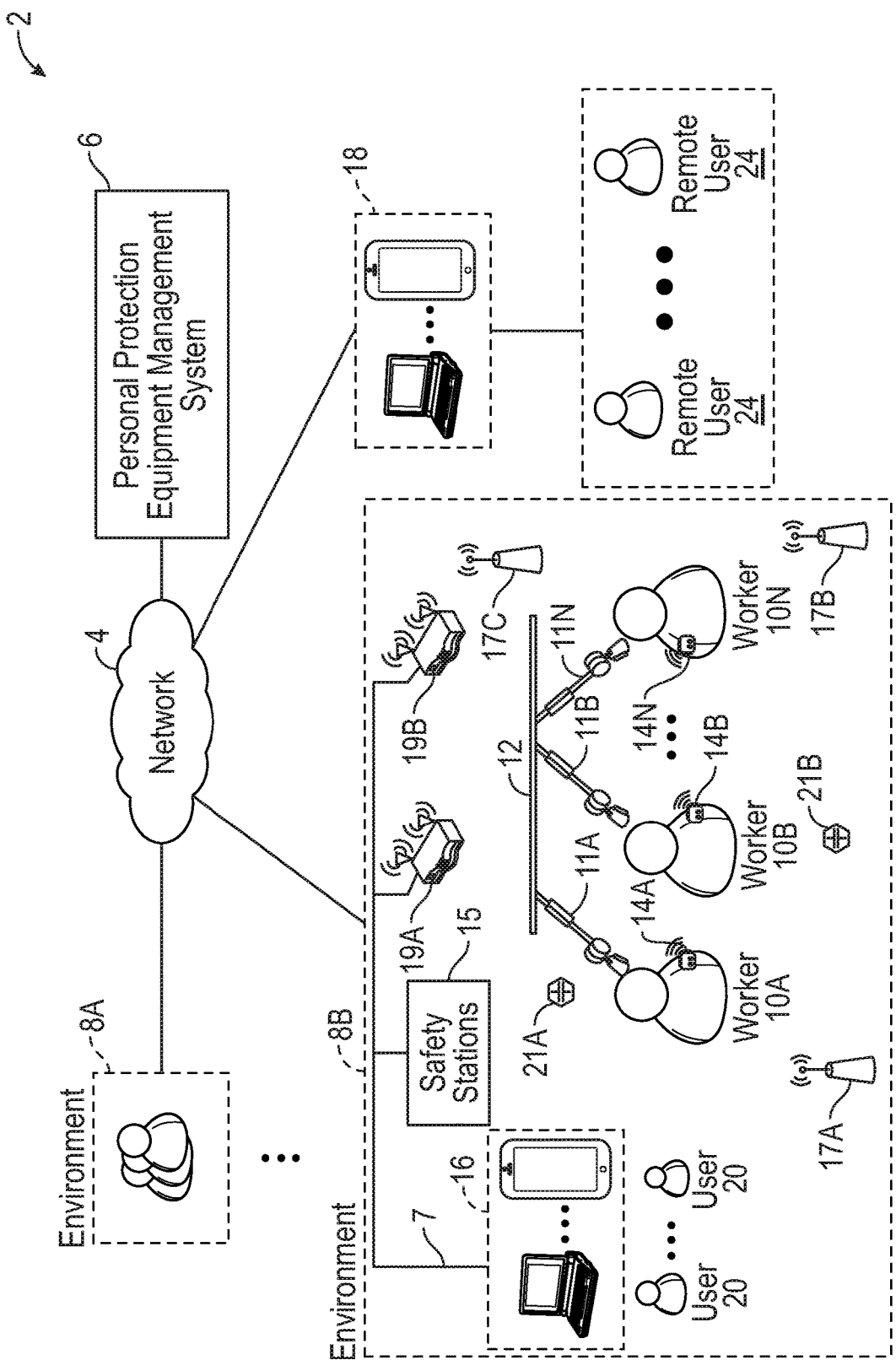
FIG. 1 is a block diagram illustrating an example system in which personal protection equipment (PPEs) having embedded sensors and communication capabilities are utilized within a number of work environments and are managed by a personal protection equipment management system in accordance with various techniques of this disclosure.

FIG. 1 is a block diagram illustrating an example computing system 2 that includes a personal protection equipment management system (PPEMS) 6 for managing personal protection equipment. As described herein, PPEMS allows authorized users to perform preventive occupational health and safety actions and manage inspections and maintenance of safety protective equipment. By interacting with PPEMS 6, safety professionals can, for example, manage area inspections, worker inspections, worker health and safety compliance training.

In general, PPEMS 6 provides data acquisition, monitoring, activity logging, reporting, predictive analytics and alert generation. For example, PPEMS 6 includes an underlying analytics and safety event prediction engine and alerting system in accordance with various examples described herein. As further described below, PPEMS 6 provides an integrated suite of personal safety protection equipment management tools and implements various techniques of this disclosure. That is, PPEMS 6 provides an integrated, end-to-end system for managing personal protection equipment, e.g., safety equipment, used by workers 8 within one or more physical environments 10, which may be construction sites, mining or manufacturing sites or any physical environment. The techniques of this disclosure may be realized within various parts of computing environment 2.

As shown in the example of FIG. 1, system 2 represents a computing environment in which a computing device within of a plurality of physical environments 8A, 8B (collectively, environments 8) electronically communicate with PPEMS 6 via one or more computer networks 4. Each of physical environment 8 represents a physical environment, such as a work environment, in which one or more individuals, such as workers 10, utilize personal protection equipment while engaging in tasks or activities within the respective environment.

In this example, environment 8A is shown as generally as having workers 10, while environment 8B is shown in expanded form to provide a more detailed example. In the example of FIG. 1, a plurality of workers 10A-10N are shown as utilizing respective fall protection equipment, which are shown in this example as self-retracting lifelines (SRLs) 11A-11N, attached to safety support structure 12.

As further described herein, each of SRLs 11 includes embedded sensors or monitoring devices and processing electronics configured to capture data in real-time as a user (e.g., worker) engages in activities while wearing the fall protection equipment. For example, as described in greater detail with respect to the example shown in FIG. 3, SRLs may include a variety of electronic sensors such as one or more of an extension sensor, a tension sensor, an accelerometer, a location sensor, an altimeter, one or more environment sensors, and/or other sensors for measuring operations of SRLs 11. In addition, each of SRLs 11 may include one or more output devices for outputting data that is indicative of operation of SRLs 11 and/or generating and outputting communications to the respective worker 10. For example, SRLs 11 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

In general, each of environments 8 include computing facilities (e.g., a local area network) by which SRLs 11 are able to communicate with PPEMS 6. For examples, environments 8 may be configured with wireless technology, such as 802.11 wireless networks, 802.15 ZigBee networks, and the like. In the example of FIG. 1, environment 8B includes a local network 7 that provides a packet-based transport medium for communicating with PPEMS 6 via network 4. In addition, environment 8B includes a plurality of wireless access points 19A, 19B that may be geographically distributed throughout the environment to provide support for wireless communications throughout the work environment.

Each of SRLs 11 is configured to communicate data, such as sensed motions, events and conditions, via wireless communications, such as via 802.11 WiFi protocols, Bluetooth protocol or the like. SRLs 11 may, for example, communicate directly with a wireless access point 19. As another example, each worker 10 may be equipped with a respective one of wearable communication hubs 14A-14M that enable and facilitate communication between SRLs 11 and PPEMS 6. In some examples, a hub may be an intrinsically safe computing device, smartphone, wrist-, head-, or body-worn computing device, or any other computing device. SRLs 11 as well as other PPEs for the respective worker 11 may communicate with a respective communication hub 14 via Bluetooth or other short range protocol, and the communication hubs may communicate with PPEMs 6 via wireless communications processed by wireless access points 19. Although shown as wearable devices, hubs 14 may be implemented as stand-alone devices deployed within environment 8B. In some examples, a hub may be an article of PPE.

In general, each of hubs 14 operates as a wireless device for SRLs 11 relaying communications to and from SRLs 11, and may be capable of buffering usage data in case communication is lost with PPEMS 6. Moreover, each of hubs 14 is programmable via PPEMS 6 so that local alert rules may be installed and executed without requiring a connection to the cloud. As such, each of hubs 14 provides a relay of streams of usage data from SRLs 11 and/or other PPEs within the respective environment, and provides a local computing environment for localized alerting based on streams of events in the event communication with PPEMS 6 is lost.

As shown in the example of FIG. 1, an environment, such as environment 8B, may also one or more wireless-enabled beacons, such as beacons 17A-17C, that provide accurate location information within the work environment. For example, beacons 17A-17C may be GPS-enabled such that a controller within the respective beacon may be able to precisely determine the position of the respective beacon. Based on wireless communications with one or more of beacons 17, a given SRL 11 or communication hub 14 worn by a worker 10 is configured to determine the location of the worker within work environment 8B. In this way, event data reported to PPEMS 6 may be stamped with positional information to aid analysis, reporting and analytics performed by the PPEMS.

In addition, an environment, such as environment 8B, may also one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of environment 8B or otherwise interact with beacons 17 to determine respective positions and include such positional information when reporting environmental data to PPEMS 6. As such, PPEMS 6 may configured to correlate the senses environmental conditions with the particular regions and, therefore, may utilize the captured environmental data when processing event data received from SRLs 11. For example, PPEMS 6 may utilize the environmental data to aid generating alerts or other instructions for SRLs 11 and for performing predictive analytics, such as determining any correlations between certain environmental conditions (e.g., heat, humidity, visibility) with abnormal worker behavior or increased safety events. As such, PPEMS 6 may utilize current environmental conditions to aid prediction and avoidance of imminent safety events. Example environmental conditions that may be sensed by sensing devices 21 include but are not limited to temperature, humidity, presence of gas, pressure, visibility, wind and the like.

In example implementations, an environment, such as environment 8B, may also include one or more safety stations 15 distributed throughout the environment to provide viewing stations for accessing PPEMs 6. Safety stations 15 may allow one of workers 10 to check out SRLs 11 and/or other safety equipment, verify that safety equipment is appropriate for a particular one of environments 8, and/or exchange data. For example, safety stations 15 may transmit alert rules, software updates, or firmware updates to SRLs 11 or other equipment. Safety stations 15 may also receive data cached on SRLs 11, hubs 14, and/or other safety equipment. That is, while SRLs 11 (and/or data hubs 14) may typically transmit usage data from sensors of SRLs 11 to network 4, in some instances, SRLs 11 (and/or data hubs 14) may not have connectivity to network 4. In such instances, SRLs 11 (and/or data hubs 14) may store usage data locally and transmit the usage data to safety stations 15 upon being in proximity with safety stations 15. Safety stations 15 may then upload the data from SRLs 11 and connect to network 4.

In addition, each of environments 8 include computing facilities that provide an operating environment for end-user computing devices 16 for interacting with PPEMS 6 via network 4. For example, each of environments 8 typically includes one or more safety managers responsible for overseeing safety compliance within the environment. In general, each user 20 interacts with computing devices 16 to access PPEMS 6. Each of environments 8 may include systems. Similarly, remote users may use computing devices 18 to interact with PPEMS via network 4. For purposes of example, the end-user computing devices 16 may be laptops, desktop computers, mobile devices such as tablets or so-called smart phones and the like.

Users 20, 24 interact with PPEMS 6 to control and actively manage many aspects of safely equipment utilized by workers 10, such as accessing and viewing usage records, analytics and reporting. For example, users 20, 24 may review usage information acquired and stored by PPEMS 6, where the usage information may include data specifying starting and ending times over a time duration (e.g., a day, a week, or the like), data collected during particular events, such as detected falls, sensed data acquired from the user, environment data, and the like. In addition, users 20, 24 may interact with PPEMS 6 to perform asset tracking and to schedule maintenance events for individual pieces of safety equipment, e.g., SRLs 11, to ensure compliance with any procedures or regulations. PPEMS 6 may allow users 20, 24 to create and complete digital checklists with respect to the maintenance procedures and to synchronize any results of the procedures from computing devices 16, 18 to PPEMS 6.

Further, as described herein, PPEMS 6 integrates an event processing platform configured to process thousand or even millions of concurrent streams of events from digitally enabled PPEs, such as SRLs 11. An underlying analytics engine of PPEMS 6 applies historical data and models to the inbound streams to compute assertions, such as identified anomalies or predicted occurrences of safety events based on conditions or behavior patterns of workers 11. Further, PPEMS 6 provides real-time alerting and reporting to notify workers 10 and/or users 20, 24 of any predicted events, anomalies, trends, and the like.

The analytics engine of PPEMS 6 may, in some examples, apply analytics to identify relationships or correlations between sensed worker data, environmental conditions, geographic regions and other factors and analyze the impact on safety events. PPEMS 6 may determine, based on the data acquired across populations of workers 10, which particular activities, possibly within certain geographic region, lead to, or are predicted to lead to, unusually high occurrences of safety events.

In this way, PPEMS 6 tightly integrates comprehensive tools for managing personal protection equipment with an underlying analytics engine and communication system to provide data acquisition, monitoring, activity logging, reporting, behavior analytics and alert generation. Moreover, PPEMS 6 provides a communication system for operation and utilization by and between the various elements of system 2. Users 20, 24 may access PPEMS to view results on any analytics performed by PPEMS 6 on data acquired from workers 10. In some examples, PPEMS 6 may present a web-based interface via a web server (e.g., an HTTP server) or client-side applications may be deployed for devices of computing devices 16, 18 used by users 20, 24, such as desktop computers, laptop computers, mobile devices such as smartphones and tablets, or the like.

In some examples, PPEMS 6 may provide a database query engine for directly querying PPEMS 6 to view acquired safety information, compliance information and any results of the analytic engine, e.g., by the way of dashboards, alert notifications, reports and the like. That is, users 24, 26, or software executing on computing devices 16, 18, may submit queries to PPEMS 6 and receive data corresponding to the queries for presentation in the form of one or more reports or dashboards. Such dashboards may provide various insights regarding system 2, such as baseline ("normal") operation across worker populations, identifications of any anomalous workers engaging in abnormal activities that may potentially expose the worker to risks, identifications of any geographic regions within environments 2 for which unusually anomalous (e.g., high) safety events have been or are predicted to occur, identifications of any of environments 2 exhibiting anomalous occurrences of safety events relative to other environments, and the like.

As illustrated in detail below, PPEMS 6 may simplify workflows for individuals charged with monitoring and ensure safety compliance for an entity or environment. That is, the techniques of this disclosure may enable active safety management and allow an organization to take preventative or correction actions with respect to certain regions within environments 8, particular pieces of safety equipment 11 or individual workers 10, define and may further allow the entity to implement workflow procedures that are data-driven by an underlying analytical engine.

As one example, the underlying analytical engine of PPEMS 6 may be configured to compute and present customer-defined metrics for worker populations within a given environment 8 or across multiple environments for an organization as a whole. For example, PPEMS 6 may be configured to acquire data and provide aggregated performance metrics and predicted behavior analytics across a worker population (e.g., across workers 10 of either or both of environments 8A, 8B). Furthermore, users 20, 24 may set benchmarks for occurrence of any safety incidences, and PPEMS 6 may track actual performance metrics relative to the benchmarks for individuals or defined worker populations.

As another example, PPEMS 6 may further trigger an alert if certain combinations of conditions are present, e.g., to accelerate examination or service of a safety equipment, such as one of SRLs 11. In this manner, PPEMS 6 may identify individual pieces of SRLs 11 or workers 10 for which the metrics do not meet the benchmarks and prompt the users to intervene and/or perform procedures to improve the metrics relative to the benchmarks, thereby ensuring compliance and actively managing safety for workers 10. In some examples, one or more operations may include changing the operation of one or more articles of PPE including but not limited to SRLs 11.

Figure 2:
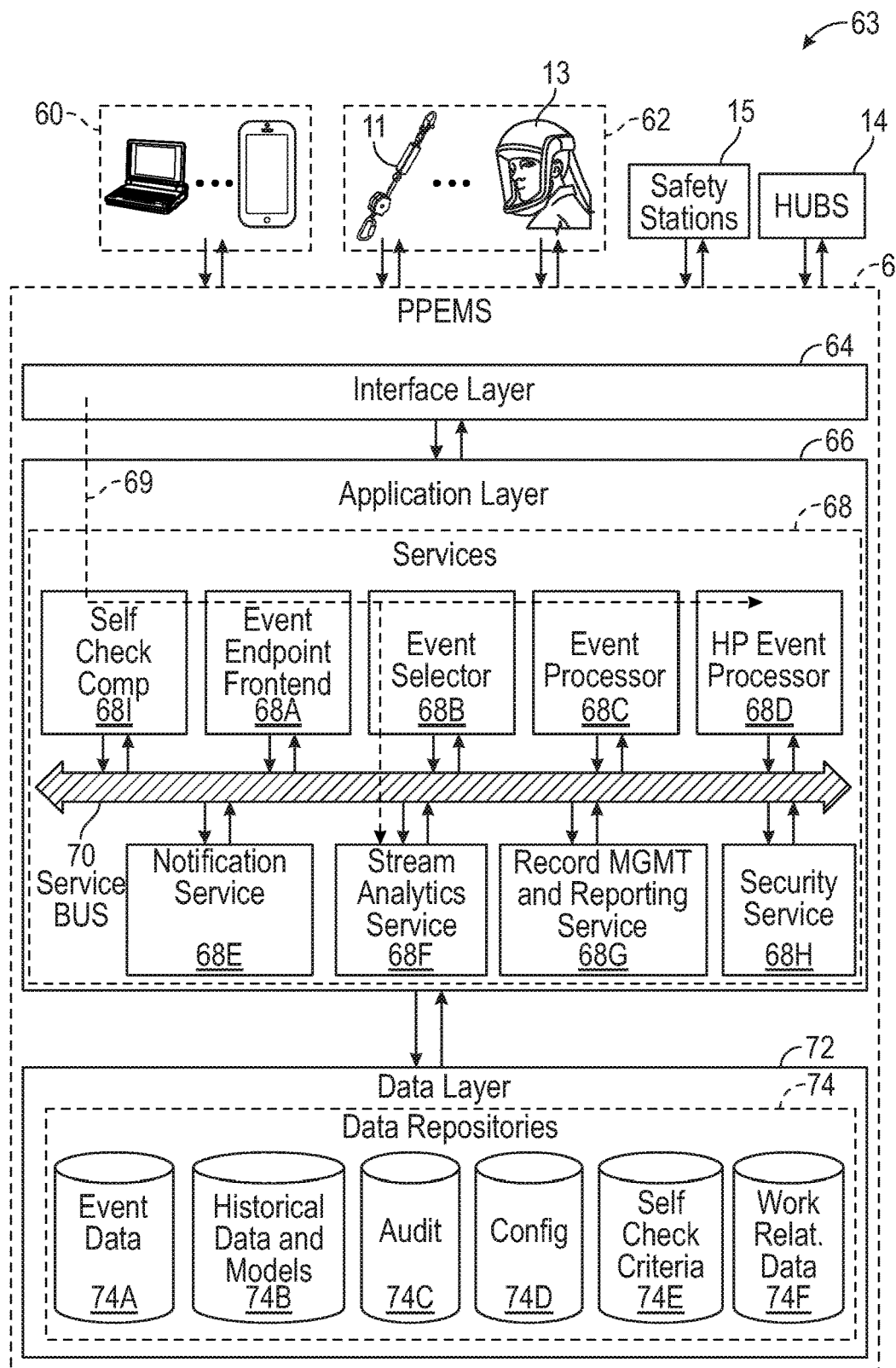
FIG. 2 is a block diagram illustrating an operating perspective of the personal protection equipment management system shown in FIG. 1.

FIG. 2 is a block diagram providing an operating perspective of PPEMS 6 when hosted as cloud-based platform capable of supporting multiple, distinct work environments 8 having an overall population of workers 10 that have a variety of communication enabled personal protection equipment (PPE), such as safety release lines (SRLs) 11, respirators 13, safety helmets or other safety equipment. In the example of FIG. 2, the components of PPEMS 6 are arranged according to multiple logical layers that implement the techniques of the disclosure. Each layer may be implemented by a one or more modules comprised of hardware, software, or a combination of hardware and software.

In FIG. 2, personal protection equipment (PPEs) 62, such as SRLs 11, respirators 13 and/or other equipment, either directly or by way of HUBs 14, as well as computing devices 60, operate as clients 63 that communicate with PPEMS 6 via interface layer 64. Computing devices 60 typically execute client software applications, such as desktop applications, mobile application, and web applications. Computing devices 60 may represent any of computing devices 16, 18 of FIG. 1. Examples of computing devices 60 may include, but are not limited to a portable or mobile computing device (e.g., smartphone, wearable computing device, tablet), laptop computers, desktop computers, smart television platforms, and servers, to name only a few examples.

As further described in this disclosure, PPEs 62 communicate with PPEMS 6 (directly or via hubs 14) to provide streams of data acquired from embedded sensors and other monitoring circuitry and receive from PPEMS 6 alerts, configuration and other communications. Client applications executing on computing devices 60 may communicate with PPEMS 6 to send and receive information that is retrieved, stored, generated, and/or otherwise processed by services 68. For instance, the client applications may request and edit safety event information including analytical data stored at and/or managed by PPEMS 6. In some examples, client applications 61 may request and display aggregate safety event information that summarizes or otherwise aggregates numerous individual instances of safety events and corresponding data acquired from PPEs 62 and or generated by PPEMS 6. The client applications may interact with PPEMS 6 to query for analytics information about past and predicted safety events, behavior trends of workers 10, to name only a few examples. In some examples, the client applications may output for display information received from PPEMS 6 to visualize such information for users of clients 63. As further illustrated and described in below, PPEMS 6 may provide information to the client applications, which the client applications output for display in user interfaces.

Clients applications executing on computing devices 60 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPEMS 6. In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 2, PPEMS 6 includes an interface layer 64 that represents a set of application programming interfaces (API) or protocol interface presented and supported by PPEMS 6. Interface layer 64 initially receives messages from any of clients 63 for further processing at PPEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward information from the requests to services 68, and provide one or more responses, based on information received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of PPEMS 6. In such examples, services 68 may generate JavaScript Object Notation (JSON) messages that interface layer 64 sends back to the client application 61 that submitted the initial request. In some examples, interface layer 64 provides web services using Simple Object Access Protocol (SOAP) to process requests from client applications 61. In still other examples, interface layer 64 may use Remote Procedure Calls (RPC) to process requests from clients 63. Upon receiving a request from a client application to use one or more services 68, interface layer 64 sends the information to application layer 66, which includes services 68.

As shown in FIG. 2, PPEMS 6 also includes an application layer 66 that represents a collection of services for implementing much of the underlying operations of PPEMS 6. Application layer 66 receives information included in requests received from client applications 61 and further processes the information according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents a logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate information to one another. As another example, services 68 may communicate in point-to-point fashion using sockets or other communication mechanism. In still other examples, a pipeline system architecture could be used to enforce a workflow and logical processing of data a messages as they are process by the software system services. Before describing the functionality of each of services 68, the layers is briefly described herein.

Data layer 72 of PPEMS 6 represents a data repository that provides persistence for information in PPEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage information in data repositories 74. The RDBMS software may manage one or more data repositories 74, which may be accessed using Structured Query Language (SQL). Information in the one or more databases may be stored, retrieved, and modified using the RDBMS software. In some examples, data layer 72 may be implemented using an Object Database Management System (ODBMS), Online Analytical Processing (OLAP) database or other suitable data management system.

As shown in FIG. 2, each of services 68A-68H ("services 68") is implemented in a modular form within PPEMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors.

In some examples, one or more of services 68 may each provide one or more interfaces that are exposed through interface layer 64. Accordingly, client applications of computing devices 60 may call one or more interfaces of one or more of services 68 to perform techniques of this disclosure.

In accordance with techniques of the disclosure, services 68 may include an event processing platform including an event endpoint frontend 68A, event selector 68B, event processor 68C and high priority (HP) event processor 68D.

Event endpoint frontend 68A operates as a front end interface for receiving and sending communications to PPEs 62 and hubs 14. In other words, event endpoint frontend 68A operates to as a front line interface to safety equipment deployed within environments 8 and utilized by workers 10. In some instances, event endpoint frontend 68A may be implemented as a plurality of tasks or jobs spawned to receive individual inbound communications of event streams 69 from the PPEs 62 carrying data sensed and captured by the safety equipment. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry data recently captured data representing sensed conditions, motions, temperatures, actions or other data, generally referred to as events. Communications exchanged between the event endpoint frontend 68A and the PPEs may be real-time or pseudo real-time depending on communication delays and continuity.

Event selector 68B operates on the stream of events 69 received from PPEs 62 and/or hubs 14 via frontend 68A and determines, based on rules or classifications, priorities associated with the incoming events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as incorrect usage of PPEs, use of incorrect filters and/or respirators based on geographic locations and conditions, failure to properly secure SRLs 11 and the like. Responsive to processing high priority events, HP event processor 68D may immediately invoke notification service 68E to generate alerts, instructions, warnings or other similar messages to be output to SRLs 11, hubs 14 and/or remote users 20, 24. Events not classified as high priority are consumed and processed by event processor 68C.

In general, event processor 68C or high priority (HP) event processor 68D operate on the incoming streams of events to update event data 74A within data repositories 74. In general, event data 74A may include all or a subset of usage data obtained from PPEs 62. For example, in some instances, event data 74A may include entire streams of samples of data obtained from electronic sensors of PPEs 62. In other instances, event data 74A may include a subset of such data, e.g., associated with a particular time period or activity of PPEs 62. Event processors 68C, 68D may create, read, update, and delete event information stored in event data 74A. Event information for may be stored in a respective database record as a structure that includes name/value pairs of information, such as data tables specified in row/column format. For instance, a name (e.g., column) may be "worker ID" and a value may be an employee identification number. An event record may include information such as, but not limited to: worker identification, PPE identification, acquisition timestamp(s) and data indicative of one or more sensed parameters.

In addition, event selector 68B directs the incoming stream of events to stream analytics service 68F, which represents an example of an analytics engine configured to perform in depth processing of the incoming stream of events to perform real-time analytics. Stream analytics service 68F may, for example, be configured to process and compare multiple streams of event data 74A with historical data and models 74B in real-time as event data 74A is received. In this way, stream analytic service 68D may be configured to detect anomalies, transform incoming event data values, trigger alerts upon detecting safety concerns based on conditions or worker behaviors. Historical data and models 74B may include, for example, specified safety rules, business rules and the like. In this way, historical data and models 74B may characterize activity of a user of SRL 11, e.g., as conforming to the safety rules, business rules, and the like. In addition, stream analytic service 68D may generate output for communicating to PPPEs 62 by notification service 68F or computing devices 60 by way of record management and reporting service 68D.

In this way, analytics service 68F processes inbound streams of events, potentially hundreds or thousands of streams of events, from enabled safety PPEs 62 utilized by workers 10 within environments 8 to apply historical data and models 74B to compute assertions, such as identified anomalies or predicted occurrences of imminent safety events based on conditions or behavior patterns of the workers. Analytics service may 68D publish the assertions to notification service 68F and/or record management by service bus 70 for output to any of clients 63.

In this way, analytics service 68F may configured as an active safety management system that predicts imminent safety concerns and provides real-time alerting and reporting. In addition, analytics service 68F may be a decision support system that provides techniques for processing inbound streams of event data to generate assertions in the form of statistics, conclusions, and/or recommendations on an aggregate or individualized worker and/or PPE basis for enterprises, safety officers and other remote users. For instance, analytics service 68F may apply historical data and models 74B to determine, for a particular worker, the likelihood that a safety event is imminent for the worker based on detected behavior or activity patterns, environmental conditions and geographic locations. In some examples, analytics service 68F may determine whether a worker is currently impaired, e.g., due to exhaustion, sickness or alcohol/drug use, and may require intervention to prevent safety events. As yet another example, analytics service 68F may provide comparative ratings of workers or type of safety equipment in a particular environment 8.

Hence, analytics service 68F may maintain or otherwise use one or more models that provide risk metrics to predict safety events. Analytics service 68F may also generate order sets, recommendations, and quality measures. In some examples, analytics service 68F may generate user interfaces based on processing information stored by PPEMS 6 to provide actionable information to any of clients 63. For example, analytics service 68F may generate dashboards, alert notifications, reports and the like for output at any of clients 63. Such information may provide various insights regarding baseline ("normal") operation across worker populations, identifications of any anomalous workers engaging in abnormal activities that may potentially expose the worker to risks, identifications of any geographic regions within environments for which unusually anomalous (e.g., high) safety events have been or are predicted to occur, identifications of any of environments exhibiting anomalous occurrences of safety events relative to other environments, and the like.

Although other technologies can be used, in one example implementation, analytics service 68F utilizes machine learning when operating on streams of safety events so as to perform real-time analytics. That is, analytics service 68F includes executable code generated by application of machine learning to training data of event streams and known safety events to detect patterns. The executable code may take the form of software instructions or rule sets and is generally referred to as a model that can subsequently be applied to event streams 69 for detecting similar patterns and predicting upcoming events.

Analytics service 68F may, in some example, generate separate models for a particular worker, a particular population of workers, a particular environment, or combinations thereof. Analytics service 68F may update the models based on usage data received from PPEs 62. For example, analytics service 68F may update the models for a particular worker, a particular population of workers, a particular environment, or combinations thereof based on data received from PPEs 62.

Alternatively, or in addition, analytics service 68F may communicate all or portions of the generated code and/or the machine learning models to hubs 16 (or PPEs 62) for execution thereon so as to provide local alerting in near-real time to PPEs. Example machine learning techniques that may be employed to generate models 74B can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

Record management and reporting service 68G processes and responds to messages and queries received from computing devices 60 via interface layer 64. For example, record management and reporting service 68G may receive requests from client computing devices for event data related to individual workers, populations or sample sets of workers, geographic regions of environments 8 or environments 8 as a whole, individual or groups/types of PPEs 62. In response, record management and reporting service 68G accesses event information based on the request. Upon retrieving the event data, record management and reporting service 68G constructs an output response to the client application that initially requested the information. In some examples, the data may be included in a document, such as an HTML document, or the data may be encoded in a JSON format or presented by a dashboard application executing on the requesting client computing device. For instance, as further described in this disclosure, example user interfaces that include the event information are depicted in the figures.

As additional examples, record management and reporting service 68G may receive requests to find, analyze, and correlate PPE event information. For instance, record management and reporting service 68G may receive a query request from a client application for event data 74A over a historical time frame, such as a user can view PPE event information over a period of time and/or a computing device can analyze the PPE event information over the period of time.

In example implementations, services 68 may also include security service 68H that authenticate and authorize users and requests with PPEMS 6. Specifically, security service 68H may receive authentication requests from client applications and/or other services 68 to access data in data layer 72 and/or perform processing in application layer 66. An authentication request may include credentials, such as a username and password. Security service 68H may query security data 74A to determine whether the username and password combination is valid. Configuration data 74D may include security data in the form of authorization credentials, policies, and any other information for controlling access to PPEMS 6. As described above, security data 74A may include authorization credentials, such as combinations of valid usernames and passwords for authorized users of PPEMS 6. Other credentials may include device identifiers or device profiles that are allowed to access PPEMS 6.

Security service 68H may provides audit and logging functionality for operations performed at PPEMS 6. For instance, security service 68H may log operations performed by services 68 and/or data accessed by services 68 in data layer 72. Security service 68H may store audit information such as logged operations, accessed data, and rule processing results in audit data 74C. In some examples, security service 68H may generate events in response to one or more rules being satisfied. Security service 68H may store data indicating the events in audit data 74C.

PPEMS 6 may include self-check component 68I, self-check criteria 74E and work relation data 74F. Self-check criteria 74E may include one or more self-check criterion. Work relation data 74F may include mappings between data that corresponds to PPE, workers, and work environments. Work relation data 74F may be any suitable datastore for storing, retrieving, updating and deleting data. RMRS 69G may store a mapping between the unique identifier of worker 10A and a unique device identifier of data hub 14A. Work relation data store 74F may also map a worker to an environment. In the example of FIG. 2, self-check component 68I may receive or otherwise determine data from work relation data 74F for data hub 14A, worker 10A, and/or PPE associated with or assigned to worker 10A. Based on this data, self-check component 68I may select one or more self-check criteria from self-check criteria 74E. Self-check component 68I may send the self-check criteria to data hub 14A.

Figure 3:
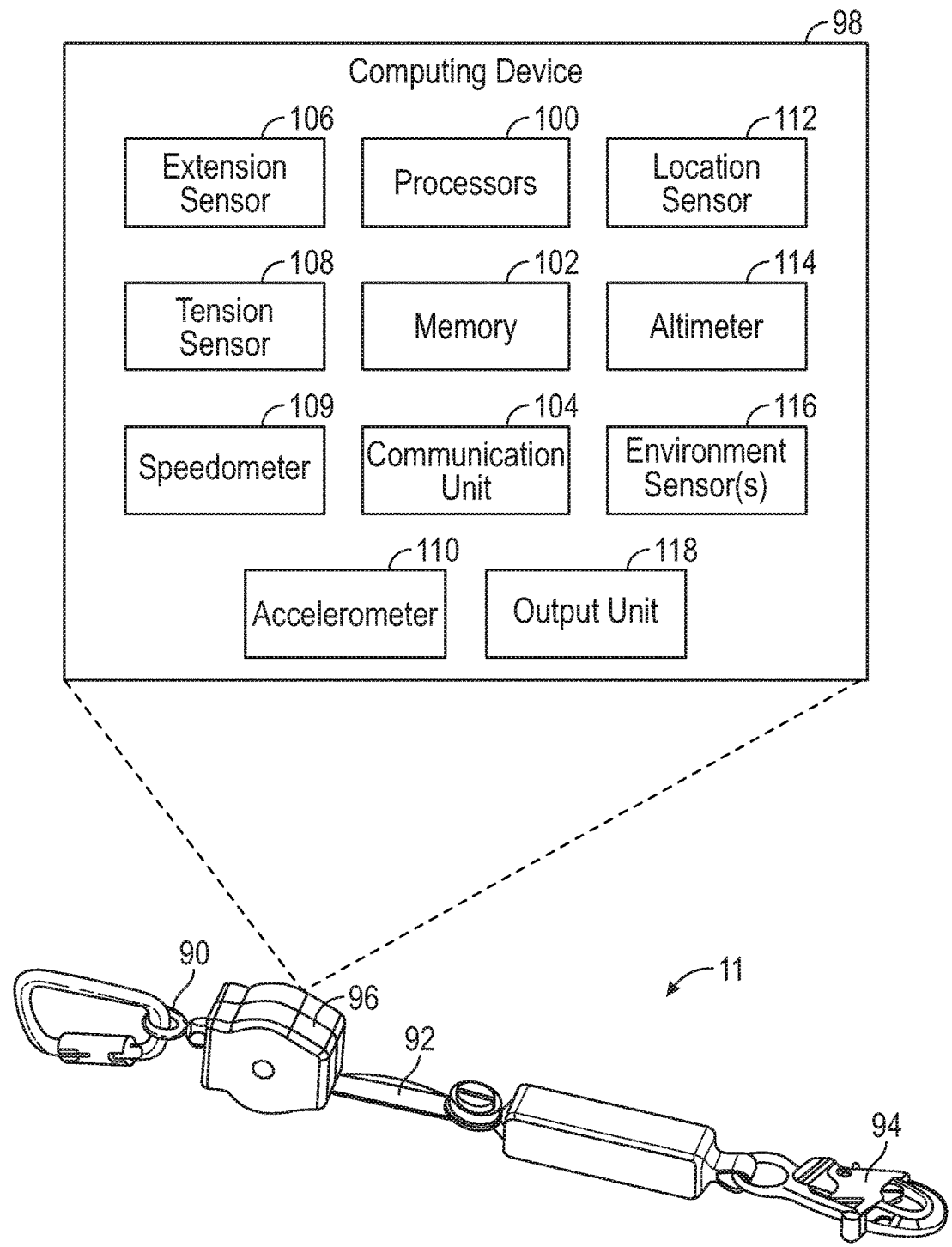
FIG. 3 is a block diagram illustrating one example of a self-retracting lifeline (SRL), in accordance with aspects of this disclosure.

FIG. 3 illustrates an example of one of SRLs 11 in greater detail. In this example, SRL 11 includes a first connector 90 for attachment to an anchor, a lifeline 92, and a second connector 94 for attachment to a user (not shown). SRL 11 also includes housing 96 that houses an energy absorption and/or braking system and computing device 98. In the illustrated example, computing device 98 includes processors 100, memory 102, communication unit 104, an extension sensor 106, a tension sensor 108, a speedometer 109, an accelerometer 110, a location sensor 112, an altimeter 114, one or more environment sensors 116, and output unit 118.

It should be understood that the architecture and arrangement of computing device 98 (and, more broadly, SRL 11) illustrated in FIG. 3 is shown for exemplary purposes only. In other examples, SRL 11 and computing device 98 may be configured in a variety of other ways having additional, fewer, or alternative components than those shown in FIG. 3. For example, in some instances, computing device 98 may be configured to include only a subset of components, such as communication unit 104 and extension sensor 106. Moreover, while the example of FIG. 3 illustrates computing device 98 as being integrated with housing 96, the techniques are not limited to such an arrangement.

First connector 90 may be anchored to a fixed structure, such as scaffolding or other support structures. Lifeline 92 may be wound about a biased drum that is rotatably connected to housing 96. Second connector 94 may be connected to a user (e.g., such as one of workers 10 (FIG. 1)). Hence, in some examples, first connector 90 may be configured as an anchor point that is connected to a support structure, and second connector 94 is configured to include a hook that is connected to a worker. In other examples, second connector 94 may be connected to an anchor point, while first connector 90 may be connected to a worker. As the user performs activities movement of lifeline 92 causes the drum to rotate as lifeline 92 is extended out and retracted into housing 96.

In general, computing device 98 may include a plurality of sensors that may capture real-time data regarding operation of SRL 11 and/or an environment in which SRL 11 is used. Such data may be referred to herein as usage data. The sensors may be positioned within housing 96 and/or may be located at other positions within SRL 11, such as proximate first connector 90 or second connector 94. Processors 100, in one example, are configured to implement functionality and/or process instructions for execution within computing device 98. For example, processors 100 may be capable of processing instructions stored by memory 102. Processors 100 may include, for example, microprocessors, digital signal processors (DSPs), application specific integrated circuits (ASICs), field-programmable gate array (FPGAs), or equivalent discrete or integrated logic circuitry.

Memory 102 may include a computer-readable storage medium or computer-readable storage device. In some examples, memory 102 may include one or more of a short-term memory or a long-term memory. Memory 102 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

In some examples, memory 102 may store an operating system (not shown) or other application that controls the operation of components of computing device 98. For example, the operating system may facilitate the communication of data from electronic sensors (e.g., extension sensor 106, tension sensor 108, accelerometer 110, location sensor 112, altimeter 114, and/or environmental sensors 116) to communication unit 104. In some examples, memory 102 is used to store program instructions for execution by processors 100. Memory 102 may also be configured to store information within computing device 98 during operation.

Computing device 98 may use communication unit 104 to communicate with external devices via one or more wired or wireless connections. Communication unit 104 may include various mixers, filters, amplifiers and other components designed for signal modulation, as well as one or more antennas and/or other components designed for transmitting and receiving data. Communication unit 104 may send and receive data to other computing devices using any one or more suitable data communication techniques. Examples of such communication techniques may include TCP/IP, Ethernet, Wi-Fi, Bluetooth, 4G, LTE, to name only a few examples. In some instances, communication unit 104 may operate in accordance with the Bluetooth Low Energy (BLU) protocol.

Extension sensor 106 may be configured to generate and output data indicative of at least one extension of lifeline 92 and a retraction of lifeline 92. In some examples, extension sensor 106 may generate data indicative of a length of extension of lifeline 92 or a length of retraction of lifeline 92. In other examples, extension sensor 106 may generate data indicative of an extension or retraction cycle. Extension sensor 106 may include one or more of a rotary encoder, an optical sensor, a Hall effect sensor, or another sensor for determining position and/or rotation. Extension sensor 106 may also include, in some examples, one or more switches that generate an output that indicates a full extension or full retraction of lifeline 92.

Tension sensor 108 may be configured to generate data indicative of a tension of lifeline 92, e.g., relative to second connector 90. Tension sensor 108 may include a force transducer that is placed in-line with lifeline 92 to directly or indirectly measure tension applied to SRL 11. In some instances, tension sensor 108 may include a strain gauge to measure static force or static tension on SRL 11. Tension sensor 108 may additionally or alternatively include a mechanical switch having a spring-biased mechanism is used to make or break electrical contacts based on a predetermined tension applied to SRL 11. In still other examples, tension sensor 108 may include one or more components for determining a rotation of friction brake of SRL 11. For example, the one or more components may include a sensor (e.g. an optical sensor, a Hall effect sensor, or the like) this is configured to determine relative motion between two components of a brake during activation of the braking system.

Speedometer 109 may be configured to generate data indicative of a speed of lifeline 92. For example, speedometer 109 may measure extension and/or retraction of lifeline (or receive such measurement from extension sensor 106) and apply the extension and/or retraction to a time scale (e.g., divide by time). Accelerometer 110 may be configured to generate data indicative of an acceleration of SRL 11 with respect to gravity. Accelerometer 110 may be configured as a single- or multi-axis accelerometer to determine a magnitude and direction of acceleration, e.g., as a vector quantity, and may be used to determine orientation, coordinate acceleration, vibration, shock, and/or falling.

Location sensor 112 may be configured to generate data indicative of a location of SRL 11 in one of environments 8. Location sensor 112 may include a Global Positioning System (GPS) receiver, componentry to perform triangulation (e.g., using beacons and/or other fixed communication points), or other sensors to determine the relative location of SRL 11.

Altimeter 114 may be configured to generate data indicative of an altitude of SRL 11 above a fixed level. In some examples, altimeter 114 may be configured to determine altitude of SRL 11 based on a measurement of atmospheric pressure (e.g., the greater the altitude, the lower the pressure).

Environment sensors 116 may be configured to generate data indicative of a characteristic of an environment, such as environments 8. In some examples, environment sensors 116 may include one or more sensors configured to measure temperature, humidity, particulate content, noise levels, air quality, or any variety of other characteristics of environments in which SRL 11 may be used.

Output unit 118 may be configured to output data that is indicative of operation of SRL 11, e.g., as measured by one or more sensors of SRL 11 (e.g., such as extension sensor 106, tension sensor 108, accelerometer 110, location sensor 112, altimeter 114, and/or environmental sensors 116). Output unit 118 may include instructions executable by processors 100 of computing device 98 to generate the data associated with operation of SRL 11. In some examples, output unit 118 may directly output the data from the one or more sensors of SRL 11. For example, output unit 118 may generate one or more messages containing real-time or near real-time data from one or more sensors of SRL 11 for transmission to another device via communication unit 104.

In other examples, output unit 118 (and/or processors 100) may process data from the one or more sensors and generate messages that characterize the data from the one or more sensors. For example, output unit 118 may determine a length of time that SRL 11 is in use, a number of extend and retract cycles of lifeline 92 (e.g., based on data from extension sensor 106), an average rate of speed of a user during use (e.g., based on data from extension sensor 106 or location sensor 112), an instantaneous velocity or acceleration of a user of SRL 11 (e.g., based on data from accelerometer 110), a number of lock-ups of a brake of lifeline 92 and/or a severity of an impact (e.g., based on data from tension sensor 108).

In some examples, output unit 118 may be configured to transmit the usage data in real-time or near-real time to another device (e.g., PPEs 62) via communication unit 104. However, in some instances, communication unit 104 may not be able to communicate with such devices, e.g., due to an environment in which SRL 11 is located and/or network outages. In such instances, output unit 118 may cache usage data to memory 102. That is, output unit 118 (or the sensors themselves) may store usage data to memory 102, which may allow the usage data to be uploaded to another device upon a network connection becoming available.

Output unit 118 may also be configured to generate an audible, visual, tactile, or other output that is perceptible by a user of SRL 11. For example, output unit 118 may include one more user interface devices including, as examples, a variety of lights, displays, haptic feedback generators, speakers or the like. In one example, output unit 118 may include one or more light emitting diodes (LEDs) that are located on SRL 11 and/or included in a remote device that is in a field of view of a user of SRL 11 (e.g., indicator glasses, visor, or the like). In another example, output unit 118 may include one or more speakers that are located on SRL 11 and/or included in a remote device (e.g., earpiece, headset, or the like). In still another example, output unit 118 may include a haptic feedback generator that generates a vibration or other tactile feedback and that is included on SRL 11 or a remote device (e.g., a bracelet, a helmet, an earpiece, or the like).

Output unit 118 may be configured to generate the output based on operation of SRL 11. For example, output unit 118 may be configured to generate an output that indicates a status of SRL 11 (e.g. that SRL 11 is operating correctly or needs to be inspected, repaired, or replaced). As another example, output unit 118 may be configured to generate an output that indicates that SRL 11 is appropriate for the environment in which SRL 11 is located. In some examples, output unit 118 may be configured to generate an output data that indicates that the environment in which SRL 11 is located is unsafe (e.g., a temperature, particulate level, location or the like is potentially dangerous to a worker using SRL 11).

SRL 11 may, in some examples, be configured to store rules that characterize a likelihood of a safety event, and output unit 118 may be configured to generate an output based on a comparison of operation of the SRL 11 (as measured by the sensors) to the rules. For example, SRL 11 may be configured to store rules to memory 102 based on the above-described models and/or historical data from PPEMS 6. Storing and enforcing the rules locally may allow SRL 11 to determine the likelihood of a safety event with potentially less latency than if such a determination was made by PPEMS 6 and/or in instances in which there is no network connectivity available (such that communication with PPEMS 6 is not possible). In this example, output unit 118 may be configured to generate an audible, visual, tactile, or other output that alerts a worker using SRL 11 of potentially unsafe activities, anomalous behavior, or the like.

According to aspects of this disclosure, SRL 11 may receive, via communication unit 104, alert data, and output unit 118 may generate an output based on the alert data. For example, SRL 11 may receive alert data from one of hubs 14, PPEMS 6 (directly or via one or hubs 14), end-user computing devices 16, remote users using computing devices 18, safety stations 15, or other computing devices. In some examples, the alert data may be based on operation of SRL 11. For example, output unit 118 may receive alert data that indicates a status of the SRL, that SRL is appropriate for the environment in which SRL 11 is located, that the environment in which SRL 11 is located is unsafe, or the like.

In some examples, additionally or alternatively, SRL 11 may receive alert data associated with a likelihood of a safety event. For example, as noted above, PPEMS 6 may, in some examples, apply historical data and models to usage data from SRL 11 in order to compute assertions, such as anomalies or predicted occurrences of imminent safety events based on environmental conditions or behavior patterns of a worker using SRL 11. That is, PPEMS 6 may apply analytics to identify relationships or correlations between sensed data from SRL 11, environmental conditions of environment in which SRL 11 is located, a geographic region in which SRL 11 is located, and/or other factors. PPEMS 6 may determine, based on the data acquired across populations of workers 10, which particular activities, possibly within certain environment or geographic region, lead to, or are predicted to lead to, unusually high occurrences of safety events. SRL 11 may receive alert data from PPEMS 6 that indicates a relatively high likelihood of a safety event.

Output unit 118 may interpret the received alert data and generate an output (e.g., an audible, visual, or tactile output) to notify a worker using SRL 11 of the alert condition (e.g., that the likelihood of a safety event is relatively high, that the environment is dangerous, that SRL 11 is malfunctioning, that one or more components of SRL 11 need to be repaired or replaced, or the like). In some instances, output unit 118 (or processors 100) may additionally or alternatively interpret alert data to modify operation or enforce rules of SRL 11 in order to bring operation of SRL 11 into compliance with desired/less risky behavior. For example, output unit 118 (or processors 100) may actuate a brake on lifeline 92 in order to prevent lifeline 92 from extending from housing 96.

Hence, according to aspects of this disclosure, usage data from sensors of SRL 11 (e.g., data from extension sensor 106, tension sensor 108, accelerometer 110, location sensor 112, altimeter 114, environmental sensors 116, or other sensors) may be used in a variety of ways. According to some aspects, usage data may be used to determine usage statistics. For example, PPEMS 6 may determine, based on usage data from the sensors, an amount of time that SRL 11 is in use, a number of extension or retraction cycles of lifeline 92, an average rate of speed with which lifeline 92 is extended or retracted during use, an instantaneous velocity or acceleration with which lifeline 92 is extended or retracted during use, a number of lock-ups of lifeline 92, a severity of impacts to lifeline 92, or the like. In other examples, the above-noted usage statistics may be determined and stored locally (e.g., by SRL 11 or one of hubs 14).

According to aspects of this disclosure, PPEMS 6 may use the usage data to characterize activity of worker 10. For example, PPEMS 6 may establish patterns of productive and nonproductive time (e.g., based on operation of SRL 11 and/or movement of worker 10), categorize worker movements, identify key motions, and/or infer occurrence of key events. That is, PPEMS 6 may obtain the usage data, analyze the usage data using services 68 (e.g., by comparing the usage data to data from known activities/events), and generate an output based on the analysis.

In some examples, the usage statistics may be used to determine when SRL 11 is in need of maintenance or replacement. For example, PPEMS 6 may compare the usage data to data indicative of normally operating SRLs 11 in order to identify defects or anomalies. In other examples, PPEMS 6 may also compare the usage data to data indicative of a known service life statistics of SRLs 11. The usage statistics may also be used to provide an understanding how SRLs 11 are used by workers 10 to product developers in order to improve product designs and performance. In still other examples, the usage statistics may be used to gathering human performance metadata to develop product specifications. In still other examples, the usage statistics may be used as a competitive benchmarking tool. For example, usage data may be compared between customers of SRLs 11 to evaluate metrics (e.g. productivity, compliance, or the like) between entire populations of workers outfitted with SRLs 11.

Additionally or alternatively, according to aspects of this disclosure, usage data from sensors of SRLs 11 may be used to determine status indications. For example, PPEMS 6 may determine that worker 10 is connected to or disconnected from SRL 11. PPEMS 6 may also determine an elevation and/or position of worker 10 relative to some datum. PPEMS 6 may also determine that worker 10 is nearing a predetermined length of extraction of lifeline 92. PPEMS 6 may also determine a proximity of worker 10 to a hazardous area in one of environments 8 (FIG. 1). In some instances, PPEMS 6 may determine maintenance intervals for SRLs 11 based on use of SRLs 11 (as indicated by usage data) and/or environmental conditions of environments in which SRLs 11 are located. PPEMS 6 may also determine, based on usage data, whether SRL 11 is connected to an anchor/fixed structure and/or whether the anchor/fixed structure is appropriate.

Additionally or alternatively, according to aspects of this disclosure, usage data from sensors of SRLs 11 may be used to assess performance of worker 10 wearing SRL 11. For example, PPEMS 6 may, based on usage data from SRLs 11, recognize motion that may indicate a pending fall by worker 10. PPEMS 6 may also, based on usage data from SRLs 11, to recognize motion that may indicate fatigue. In some instances, PPEMS 6 may, based on usage data from SRLs 11, infer that a fall has occurred or that worker 10 is incapacitated. PPEMS 6 may also perform fall data analysis after a fall has occurred and/or determine temperature, humidity and other environmental conditions as they relate to the likelihood of safety events.

Additionally or alternatively, according to aspects of this disclosure, usage data from sensors of SRLs 11 may be used to determine alerts and/or actively control operation of SRLs 11. For example, PPEMS 6 may determine that a safety event such as a fall is imminent and active a brake of SRL 11. In some instances, PPEMS 6 may adjust the performance of the arrest characteristics to the fall dynamics. That is, PPEMS 6 may alert that control that is applied to SRL 11 based on the particular characteristics of the safety event (e.g., as indicated by usage data). PPEMS 6 may provide, in some examples, a warning when worker 10 is near a hazard in one of environments 8 (e.g., based on location data gathered from location sensor 112). PPEMS 6 may also lock out SRL 11 such that SRL 11 will not operate after SRL 11 has experienced an impact or is in need of service.

Again, PPEMS 6 may determine the above-described performance characteristics and/or generate the alert data based on application of the usage data to one or more safety models that characterizes activity of a user of SRL 11. The safety models may be trained based on historical data or known safety events. However, while the determinations are described with respect to PPEMS 6, as described in greater detail herein, one or more other computing devices, such as hubs 14 or SRLs 11 may be configured to perform all or a subset of such functionality.

In some instances, PPEMS 6 may apply analytics for combinations of PPE. For example, PPEMS 6 may draw correlations between users of SRLs 11 and/or the other PPE that is used with SRLs 11. That is, in some instances, PPEMS 6 may determine the likelihood of a safety event based not only on usage data from SRLs 11, but also from usage data from other PPE being used with SRLs 11. In such instances, PPEMS 6 may include one or more safety models that are constructed from data of known safety events from one or more devices other than SRLs 11 that are in use with SRLs 11.

Figure 4A:
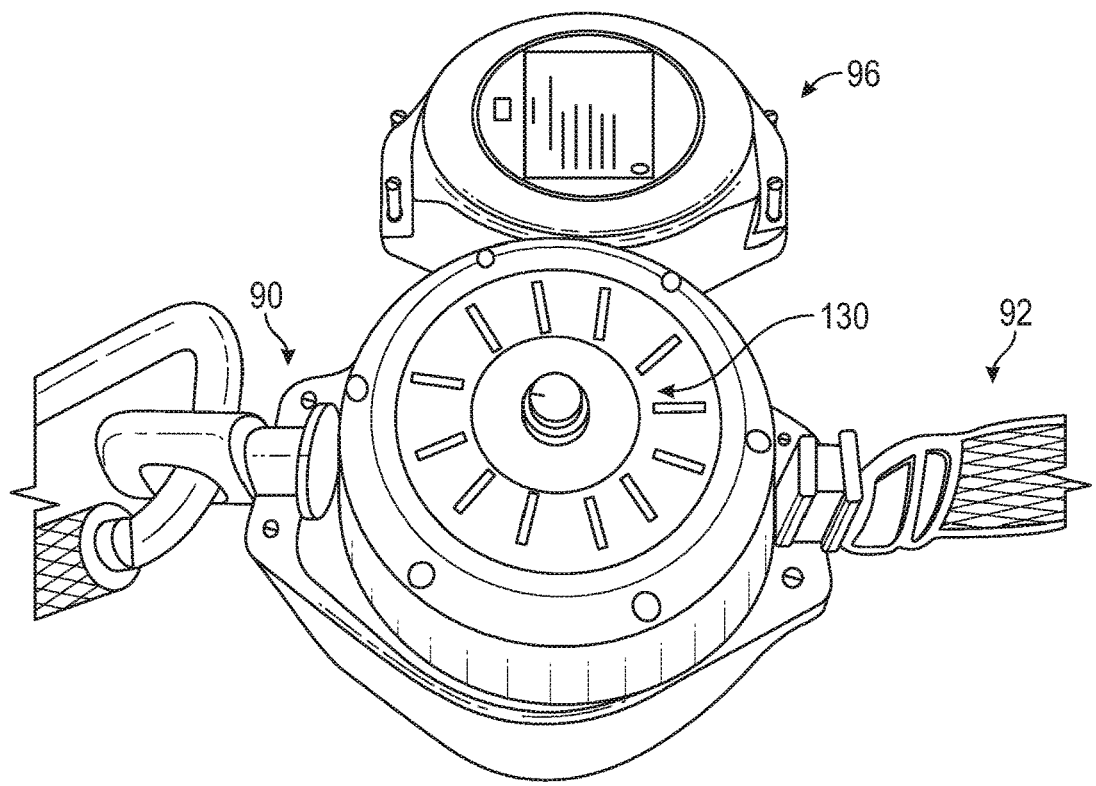
FIG. 4A illustrates an example of an encoder that may be included in an SRL, in accordance with aspects of this disclosure.

FIG. 4A illustrates an example of internal components of SRL 11, as contained within housing 96. In the illustrated example, SRL 11 includes an encoder 130 that is incorporated on a drum of SRL 11. In some examples, encoder 130 may comprise at least a portion of extension sensor 106 shown in FIG. 3. Encoder 130 may be configured to measure line length of lifeline 92 as lifeline 92 is extended from housing 96. Encoder 130 may be configured to output data that is indicative of a number of turns of the drum upon which lifeline 92 is wound, an angular speed of the drum, and/or an angular acceleration of the drum, or the like. Such data may be used to determine a line length of lifeline 92 (e.g., a quantity of lifeline 92 that has been extended from housing 96), a linear speed with which lifeline 92 is extended, and/or a linear acceleration with which lifeline 92 is extended.

For example, in some instances, encoder 130 may be configured as a rotary encoder (also referred to as a shaft encoder) that converts the angular position or motion of a shaft or axle of the drum upon which lifeline 92 is wound to an analog or digital code. Encoder 130 may be configured as an absolute encoders that outputs data indicative of a current position of the shaft or an incremental encoder that provides data indicative of the motion of the shaft, which SRL 11 may further process to determine position, distance, speed, acceleration or the like.

Figure 4B:
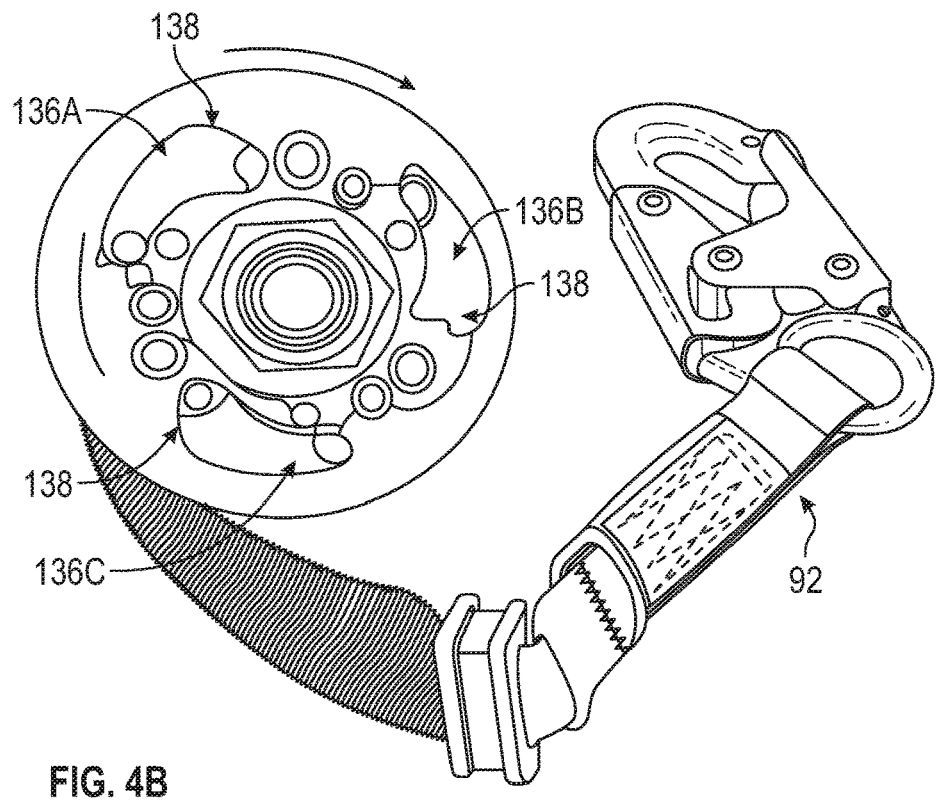
FIG. 4B illustrates and example of a deflector unit that may be included in an SRL, in accordance with aspects of this disclosure.

FIG. 4B illustrates another example of internal components of SRL 11, as contained within housing 96 (FIG. 3). In the illustrated example, SRL 11 includes eccentric deflectors 136A-136C (collectively, eccentric deflectors 136). Each of eccentric deflectors 136 includes a weighted end 138 that moves outward as angular acceleration and/or angular speed reach a predetermined threshold to overcome biasing force, e.g., a spring tension, resisting outward movement. As such, eccentric deflectors 136 may generate data that indicates a speed and/or acceleration of a drum upon which lifeline 92 is wound as lifeline 92 is extended from housing 96. From the speed and/or acceleration data, SRL 11 may determine that a fall has occurred.

Figure 5:
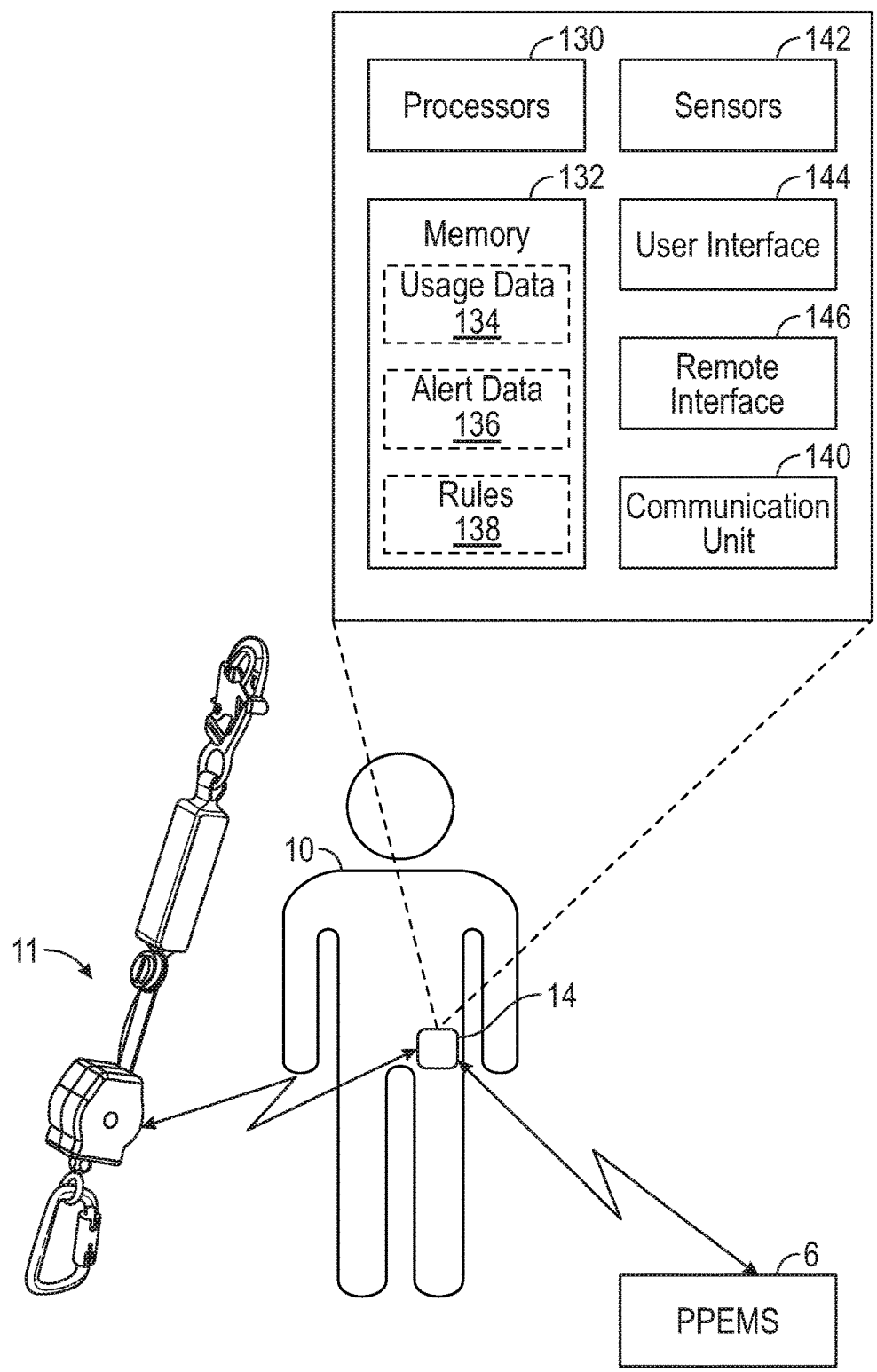
FIG. 5 is a conceptual diagram illustrating an example of an SRL in communication with a wearable data hub, in accordance with various aspects of this disclosure.

FIG. 5 illustrates an example of one of hubs 14 in greater detail. For example, hub 14 includes one or more processors 130, memory 132 that may store usage data 134, alert data 136 and/or rules 136, communication unit 140, sensors 142, user interface 144, and remote interface 146. It should be understood that the architecture and arrangement of hub 14 illustrated in FIG. 5 is shown for exemplary purposes only. In other examples, hub 14 may be configured in a variety of other ways having additional, fewer, or alternative components than those shown in FIG. 5. For example, hub 14 may also include one or more batteries, charging components, or the like not shown in FIG. 5. In addition, while shown as a wearable device in the example of FIG. 5, in other examples, hub 14 may be implemented as stand-alone device deployed in a particular environment.

In general, hub 14 may enable and facilitate communication between SRLs 11 and PPEMS 6. For examples, SRLs 11 as well as other PPEs for a respective worker may communicate with hub 14 via Bluetooth or other short range protocol, and hub 14 may communicate with PPEMs 6 via wireless communications, such as via 802.11 WiFi protocols, or the like. In some examples, as described in greater detail herein, hub 14 may also implement rules that characterize the likelihood of a safety event (e.g., from PPEMs), generate and/or output alerts, or perform a variety of other functions.

Processors 130, in one example, are configured to implement functionality and/or process instructions for execution within hub 14. For example, processors 130 may be capable of processing instructions stored by memory 132. Processors 130 may include, for example, microprocessors, digital signal processors (DSPs), application specific integrated circuits (ASICs), field-programmable gate array (FPGAs), or equivalent discrete or integrated logic circuitry.

Memory 132 may include a computer-readable storage medium or computer-readable storage device. In some examples, memory 132 may include one or more of a short-term memory or a long-term memory. Memory 132 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

In some examples, memory 132 may store an operating system (not shown) or other application that controls the operation of components of hub 14. For example, the operating system may facilitate the communication of data from memory 132 to communication unit 140. In some examples, memory 132 is used to store program instructions for execution by processors 100. Memory 132 may also be configured to store information within hub 14 during operation. In the example shown in FIG. 5, memory 132 may store usage data 134, alert data 136, and/or rules 138, as described in greater detail below.

Hub 14 may use communication unit 140 to communicate with external devices via one or more wired or wireless connections. Communication unit 140 may include various mixers, filters, amplifiers and other components designed for signal modulation, as well as one or more antennas and/or other components designed for transmitting and receiving data. Communication unit 140 may send and receive data to other computing devices using any one or more suitable data communication techniques. Examples of such communication techniques may include TCP/IP, Ethernet, Wi-Fi, Bluetooth, 4G, LTE, to name only a few examples. For example, communication unit 140 may communicate with SRL 11 or other PPE via Bluetooth or other short range protocol, and communication unit 140 may communicate with PPEMs 6 via wireless communications, such as via 802.11 WiFi protocols, or the like.

Sensors 142 may include one or more sensors that generate data indicative of an activity of a worker 10 associated with hub 14 and/or data indicative of an environment in which hub 14 is located. Sensors 142 may include, as examples, one or more accelerometers, one or more sensors to detect conditions present in a particular environment (e.g., sensors for measuring temperature, humidity, particulate content, noise levels, air quality, or any variety of other characteristics of environments in which SRL 11 may be used), or a variety of other sensors.

User interface 144 may include one more user interface devices including, as examples, a variety of lights, displays, haptic feedback generators, speakers or the like. In general, user interface 144 may output a status of SRL 11 and/or hub 14, as well as any alerts for worker 10. In one example, user interface 144 may include a plurality of multi-color LEDs that illuminate to provide information to worker 10. In another example, user interface 144 may include a motor that is configured to vibrate hub 14 to provide haptic feedback to worker 10.

Remote interface 146 is configured to generate data for output at clients 62 (FIG. 2). For example, remote interface 146 may generate data indicative of a status of SRL 11 and/or hub 14. For example, remote interface 146 may generate data that indicates whether SRL 11 is connected to hub 14 and/or information about components of SRL 11. That is, remote interface 146 may generate data indicative of, as examples, remaining service life of SRL 11, a status of a battery of SRL 11, a quantity of lifeline 92 that is extended from housing 96 (FIG. 3), a maximum extension distance of lifeline 92, a number of extension/retraction cycles of lifeline 92, whether maintenance or replacement of SRL 11 is needed, position/speed/acceleration of lifeline 92, or the like. Remote interface 146 may additionally or alternatively generate data that is indicative of any alerts issued by hub 14.

According to aspects of this disclosure, hub 14 may store usage data 134 from sensors of SRL 11. For example, as described herein, sensors of SRL 11 may generate data regarding operation of SRL 11 that is indicative of activities of worker 10 and transmit the data in real-time or near real-time to hub 14. In some examples, hub 134 may immediately relay usage data 134 to another computing device, such as PPEMS 6, via communication unit 140. In other examples, memory 132 may store usage data 134 for some time prior to uploading the data to another device. For example, in some instances, communication unit 140 may be able to communicate with SRL 11 but may not have network connectivity, e.g., due to an environment in which SRL 11 is located and/or network outages. In such instances, hub 14 may store usage data 134 to memory 132, which may allow the usage data to be uploaded to another device upon a network connection becoming available.

According to aspects of this disclosure, hub 14 may store alert data 136 for generating alerts for output by user interface 144 and/or remote interface 146. For hub 14 may receive alert data from PPEMS 6, end-user computing devices 16, remote users using computing devices 18, safety stations 15, or other computing devices. In some examples, the alert data may be based on operation of SRL 11. For example, hub 14 may receive alert data 136 that indicates a status of SRL 11, that SRL 11 is appropriate for the environment in which SRL 11 is located, that the environment in which SRL 11 is located is unsafe, or the like.

In some examples, additionally or alternatively, hub 14 may receive alert data 136 associated with a likelihood of a safety event. For example, as noted above, PPEMS 6 may, in some examples, apply historical data and models to usage data from SRL 11 in order to compute assertions, such as anomalies or predicted occurrences of imminent safety events based on environmental conditions or behavior patterns of a worker using SRL 11. That is, PPEMS 6 may apply analytics to identify relationships or correlations between sensed data from SRL 11, environmental conditions of environment in which SRL 11 is located, a geographic region in which SRL 11 is located, and/or other factors. PPEMS 6 may determine, based on the data acquired across populations of workers 10, which particular activities, possibly within certain environment or geographic region, lead to, or are predicted to lead to, unusually high occurrences of safety events. Hub 14 may receive alert data 136 from PPEMS 6 that indicates a relatively high likelihood of a safety event.

Hub 14 may interpret the received alert data 136 and generate an output at user interface 144 (e.g., an audible, visual, or tactile output) or remote interface 146 to notify worker 10 or a remote party of the alert condition (e.g., that the likelihood of a safety event is relatively high, that the environment is dangerous, that SRL 11 is malfunctioning, that one or more components of SRL 11 need to be repaired or replaced, or the like). In some instances, hub 14 may also interpret alert data 136 and issue one or more commands to SRL 11 to modify operation or enforce rules of SRL 11 in order to bring operation of SRL 11 into compliance with desired/less risky behavior.

According to aspects of this disclosure, in some instances, hub 14 may store rules 138 for generating alert data 136 and issuing alerts. For example, hub 14 may be configured to store rules 138 that characterize a likelihood of a safety event, and user interface 144 and/or remote interface may generate an output based on a comparison of operation of the SRL 11 to rules 138. Rules 138 may be defined based on the above-described models and/or historical data from PPEMS 6. In some examples, PPEMS 6 may provide hub 14 with rules 138, which may comprise a subset of rules generated by PPEMS 6 based on one or more safety models. In such examples, hub 14 may implement rules 138 without network connectivity to PPEMS 6.

In general, while certain techniques or functions are described herein as being performed by certain components, e.g., PPEMS 6, SRLs 11, or hubs 14, it should be understood that the techniques of this disclosure are not limited in this way. That is, certain techniques described herein may be performed by one or more of the components of the described systems. For example, in some instances, SRLs 11 may have a relatively limited sensor set and/or processing power. In such instances, one of hubs 14 and/or PPEMS 6 may responsible for most or all of the processing of usage data, determining the likelihood of a safety event, and the like. In other examples, SRLs 11 may have additional sensors, additional processing power, and/or additional memory, allowing for SRLs 11 to perform additional techniques. Determinations regarding which components are responsible for performing techniques may be based, for example, on processing costs, financial costs, power consumption, or the like.

Figure 6:
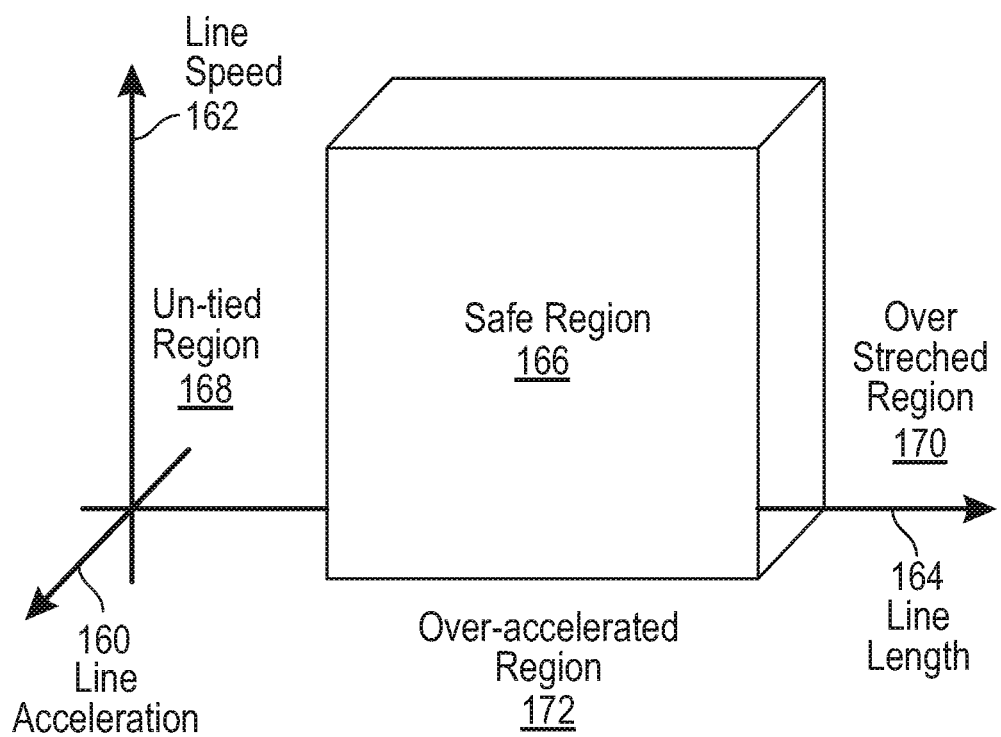
FIG. 6 illustrates an example model applied by the personal protection equipment management system or other devices herein with respect to worker activity in terms of measure line speed, acceleration and line length, where the model is arranged to define safe regions and regions unsafe behavior predictive of safety events, in accordance with aspects of this disclosure.

FIG. 6 illustrates an example model applied by the personal protection equipment management system or other devices herein with respect to worker activity in terms of measure line speed, acceleration and line length, where the model is arranged to define safe regions and regions unsafe. In other words, FIG. 6 is a graph representative of a model applied by PPEMS 6, hubs 14 or SRLs 11 to predict the likelihood of a safety event based on measurements of acceleration 160 of a lifeline (such as lifeline 92 shown in FIG. 3) being extracted, speed 162 of a lifeline 92 being extracted, and length 164 of a lifeline that has been extracted. The measurements of acceleration 160, speed 162, and length 164 may be determined based on data collected from sensors of SRLs 11. Data represented by the graph may be estimated or collected in a training/test environment and the graph may be used as a "map" to distinguish safe activities of a worker from unsafe activities.

For example, safe region 166 may represent measurements of acceleration 160, speed 162, and length 164 that are associated with safe activities (e.g., as determined by monitoring activities of a worker in a test environment). Untied region 168 may represent measurements of acceleration 160, speed 162, and length 164 that are associated with a lifeline that is not securely anchored to a support structure, which may be considered unsafe. Over stretched region 170 may represent measurements of acceleration 160, speed 162, and length 164 that are associated with a lifeline that is extended beyond normal operating parameters, which may also be considered unsafe.

According to aspects of this disclosure, PPEMS 6, hubs 14, or SRLs 11 may issue one or more alerts by applying a model or rule set represented by FIG. 6 to usage data received from SRLs 11. For example, PPEMS 6, hubs 14, or SRLs 11 may issue an alert if measurements of acceleration 160, speed 162, or length 164 are outside of safe region 166. In some instances, different alerts may be issued based how far measurements of acceleration 160, speed 162, or length 164 are outside of safe region 166. For example, if measurements of acceleration 160, speed 162, or length 164 are relatively close to safe region 166, PPEMS 6, hubs 14, or SRLs 11 may issue a warning that the activity is of concern and may result in a safety event. In another example, if measurements of acceleration 160, speed 162, or length 164 are relatively far from safe region 166, PPEMS 6, hubs 14, or SRLs 11 may issue a warning that the activity is unsafe and has a high likelihood of an immediate safety event.

In some instances, the data of the graph shown in FIG. 6 may be representative of historical data and models 74B shown in FIG. 2. In this example, PPEMS 6 may compare incoming streams of data to the map shown in FIG. 6 to determine a likelihood of a safety event. In other instances, a similar map may additionally or alternatively be stored to SRLs 11 and/or hubs 14, and alerts may be issued based on the locally stored data.

While the example of FIG. 6 illustrates acceleration 160, speed 162, and length 164, other maps have more or fewer variables than those shown may be developed. In one example, a map may be generated based only on a length of a lifeline. In this example, an alert may be issued to a worker when the lifeline is extended beyond a line length specified by the map.

Figure 7:
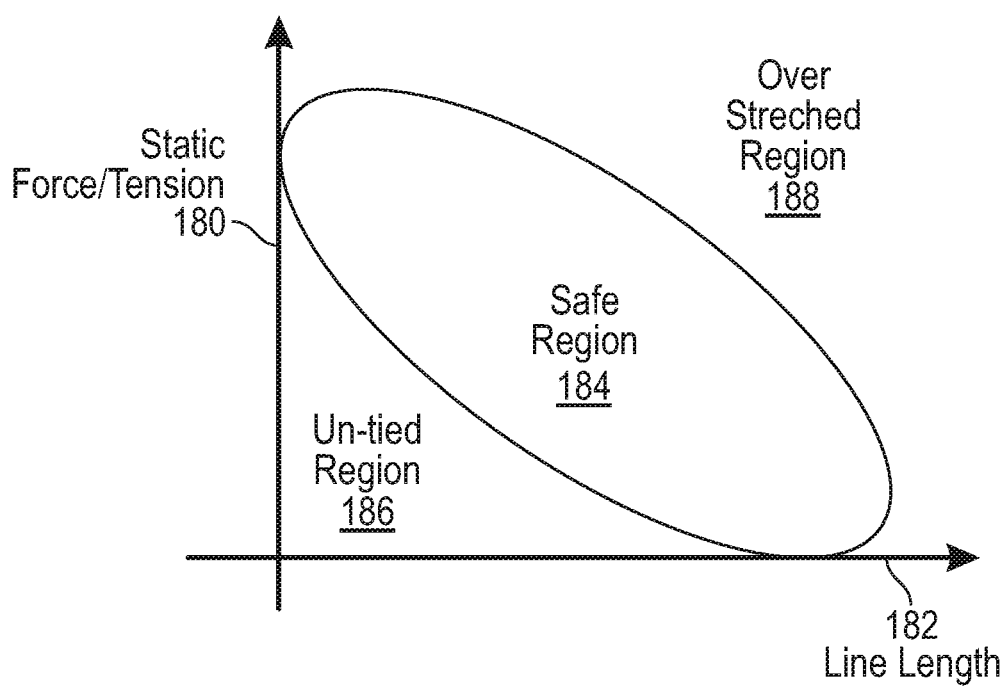
FIG. 7 illustrates an example of a second model applied by the personal protection equipment management system or other devices herein with respect to worker activity in terms of measure force/tension on the safety line and length, where the model is arranged to define a safe region and regions unsafe behavior predictive of safety events, in accordance with aspects of this disclosure.

FIG. 7 illustrates an example of a second model applied by the personal protection equipment management system or other devices herein with respect to worker activity in terms of measure force/tension on the safety line and length, where the model is arranged to define a safe region and regions unsafe behavior predictive of safety events, in accordance with aspects of this disclosure. In this example, FIG. 7 is a graph representative of a model or ruleset applied by PPEMS 6, hubs 14 or SRLs 11 to predict the likelihood of a safety event based on measurements of force or tension 180 on a lifeline (such as lifeline 92 shown in FIG. 3) and length 182 of a lifeline that has been extracted. The measurements of force or tension 180 and length 182 may be determined based on data collected from sensors of SRLs 11. Data represented by the graph may be estimated or collected in a training/test environment and the graph may be used as a "map" to distinguish safe activities of a worker from unsafe activities.

For example, safe region 184 may represent measurements of force or tension 180 and length 182 that are associated with safe activities (e.g., as determined by monitoring activities of a worker in a test environment). Untied region 186 may represent measurements of force or tension 180 and length 182 that are associated with a lifeline that is not securely anchored to a support structure, which may be considered unsafe. Over stretched region 188 may represent measurements of force or tension 180 and length 182 that are associated with a lifeline that is extended beyond normal operating parameters, which may also be considered unsafe.

According to aspects of this disclosure, PPEMS 6, hubs 14, or SRLs 11 may issue one or more alerts by applying a model or rule set represented by FIG. 6 to usage data from SRLs 11, in a manner similar to that described above with respect to FIG. 6. In some instances, the data of the graph shown in FIG. 7 may be representative of historical data and models 74B shown in FIG. 2. In other instances, a similar map may additionally or alternatively be stored to SRLs 11 and/or hubs 14, and alerts may be issued based on the locally stored data.

Figure 8A:
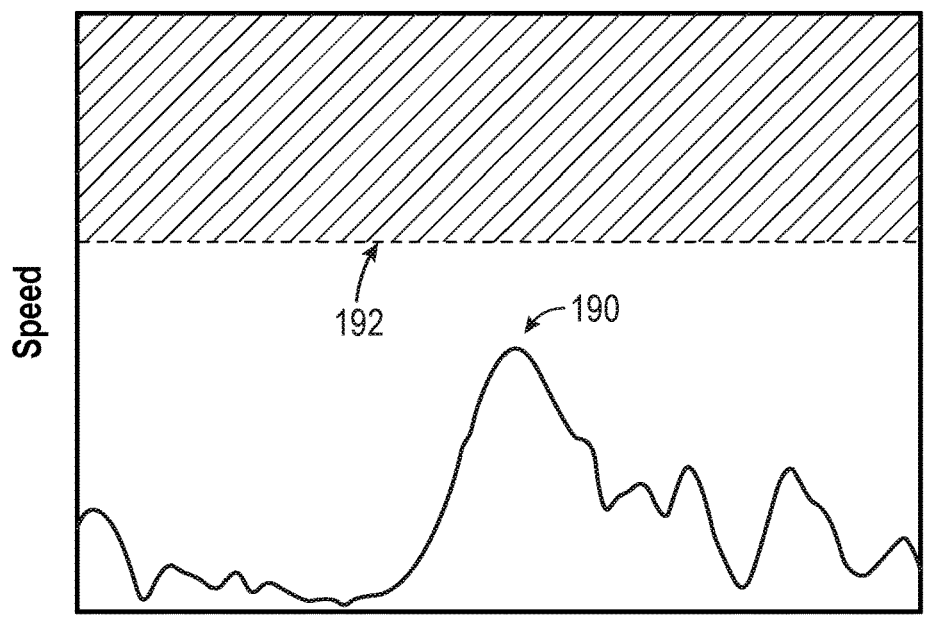
FIGS. 8A and 8B illustrate profiles of example usage data from workers determined by the personal protection equipment management system to represent low risk behavior and high risk behavior triggering alerts or other responses, in accordance with aspects of this disclosure.
Figure 8B:
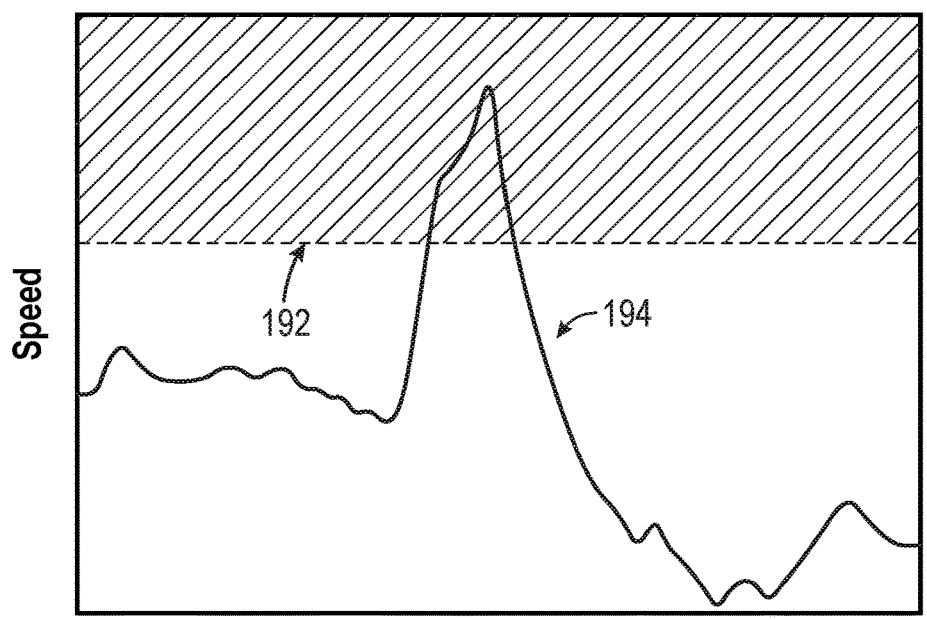

FIGS. 8A and 8B illustrate profiles of example input streams of event data received and processed by PPEMS 6, hubs 14 or SRLs 11 and, based on application of one or more models or rules sets, determined to represent low risk behavior (FIG. 8A) and high risk behavior (FIG. 8B), which results in triggering of alerts or other responses, in accordance with aspects of this disclosure. In the examples, FIGS. 8A and 8B illustrate profiles of example event data determined to indicate safe activity and unsafe activity, respectively, over a period of time. For example, the example of FIG. 8A illustrates a speed 190 with which a lifeline (such as lifeline 92 shown in FIG. 3) is extracted relative to a kinematic threshold 192, while the example of FIG. 8B illustrates a speed 194 with which a lifeline (such as lifeline 92 shown in FIG. 3) is extracted relative to threshold 192.

In some instances, the profiles shown in FIGS. 8A and 8B may be developed and stored as historical data and models 74B of PPEMS 6 shown in FIG. 2. According to aspects of this disclosure, PPEMS 6, hubs 14, or SRLs 11 may issue one or more alerts by comparing usage data from SRLs 11 to threshold 192. For example, PPEMS 6, hubs 14, or SRLs 11 may issue one or more alerts when speed 194 exceeds threshold 192 in the example of FIG. 8B. In some instances, different alerts may be issued based how much the speed exceeds threshold 192, e.g., to distinguish risky activities from activity is unsafe and has a high likelihood of an immediate safety event.

Figure 9:
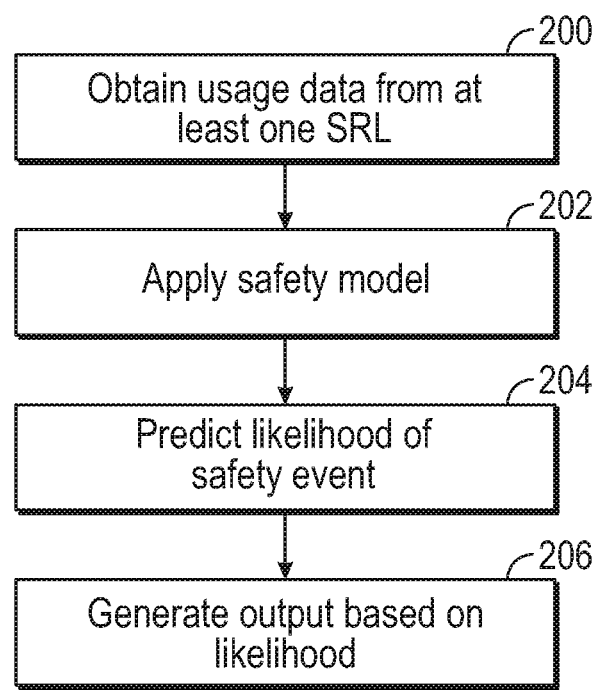
FIG. 9 is a flow diagram illustrating an example process for predicting the likelihood of a safety event, according to aspects of this disclosure.

FIG. 9 is an example process for predicting the likelihood of a safety event, according to aspects of this disclosure. While the techniques shown in FIG. 9 are described with respect to PPEMS 6, it should be understood that the techniques may be performed by a variety of computing devices.

In the illustrated example, PPEMS 6 obtains usage data from at least one self-retracting lifeline (SRL), such as at least one of SRLs 11 (200). As described herein, the usage data comprises data indicative of operation of SRL 11. In some examples, PPEMS 6 may obtain the usage data by polling SRLs 11 or hubs 14 for the usage data. In other examples, SRLs 11 or hubs 14 may send usage data to PPEMS 6. For example, PPEMS 6 may receive the usage data from SRLs 11 or hubs 14 in real time as the usage data is generated. In other examples, PPEMS 6 may receive stored usage data.

PPEMS 6 may apply the usage data to a safety model that characterizes activity of a user of the at least one SRL 11 (202). For example, as described herein, the safety model may be trained based on data from known safety events and/or historical data from SRLs 11. In this way, the safety model may be arranged to define safe regions and regions unsafe.

PPEMS 6 may predict a likelihood of an occurrence of a safety event associated with the at least one SRL 11 based on application of the usage data to the safety model (204). For example, PPEMS 6 may apply the obtained usage data to the safety model to determine whether the usage data is consistent with safe activity (e.g., as defined by the model) or potentially unsafe activity.

PPEMS 6 may generate an output in response to predicting the likelihood of the occurrence of the safety event (206). For example, PPEMS 6 may generate alert data when the usage data is not consistent with safe activity (as defined by the safety model). PPEMS 6 may send the alert data to SRL 11, a safety manager, or another third party that indicates the likelihood of the occurrence of the safety event.

Example 1

A method comprising: obtaining usage data from at least one self-retracting lifeline (SRL), wherein the usage data comprises data indicative of operation of the at least one SRL; applying, by an analytics engine implemented at a computing device, the usage data to a safety model that characterizes activity of a user of the at least one SRL; predicting a likelihood of an occurrence of a safety event associated with the at least one SRL based on application of the usage data to the safety model; and generating an output in response to predicting the likelihood of the occurrence of the safety event.

Example 2

The method of Example 1, wherein the safety model is constructed from historical data of known safety events from a plurality of SRLs having similar characteristics to the at least one SRL.

Example 3

The method of any of Examples 1-2, further comprising updating the safety model based on the usage data from the at least one SRL.

Example 4

The method of any of Examples 1-3, wherein the safety model is constructed from data of known safety events from one or more devices other than SRLs that are in use with the at least one SRL.

Example 5

The method of any of Examples 1-4, further comprising selecting the safety model based on at least one of a configuration of the at least one SRL, a user of the at least one SRL, an environment in which the at least one SRL is located, or one or more other devices that are in use with the at least one SRL.

Example 6

The method of any of Examples 1-5, wherein the usage data representative of activity of a user of the at least one SRL during a time period, and wherein the usage data comprises data indicative of at least one of extension and retraction of a lifeline of the SRL, a force applied to the lifeline of the at least one SRL, an acceleration of the at least one SRL, a location of the at least one SRL, or an altitude of the at least one SRL.

Example 7

The method of any of Examples 1-6, wherein the usage data comprises environmental data associated with an environment in which the at least one SRL is located, such that the likelihood of the occurrence of the safety event is based on the environment in which the SRL is located.

Example 8

The method of any of Examples 1-7, wherein applying the usage data to the safety model that characterizes activity of the user comprises applying the usage data to a safety model that is constructed from training data of known safety events associated with a plurality of SRLs.

Example 9

The method of any of Examples 1-8, wherein predicting the likelihood of the occurrence of the safety event comprises identifying anomalous behavior of a user of the at least one SRL relative to known safe behavior characterized by the safety model.

Example 10

The method of any of Examples 1-9, wherein predicting the likelihood of the occurrence of the safety event further comprises identifying regions within a work environment in which the at least one SRL is deployed that are associated with an anomalous number of safety events.

Example 11

The method of any of Examples 1-10, wherein applying the usage data to the safety model comprises applying the usage data to a safety model that characterizes a speed of a user of at least one SRL, and wherein predicting the likelihood of the occurrence of the safety event comprises determining that the speed of the user over a time period exceeds a speed associated with safe activity over the time period.

Example 12

The method of any of Examples 1-11, wherein applying the usage data to the safety model comprises applying the usage data to a safety model that characterizes a force applied to a lifeline of the at least one SRL by a user of the at least one SRL, and wherein predicting the likelihood of the occurrence of the safety event comprises determining that the force applied over a time period exceeds a force associated with safe activity over the time period.

Example 13

The method of any of Examples 1-12, wherein applying the usage data to the safety model comprises applying the usage data to a safety model that characterizes an extension length of a lifeline of the at least one SRL, and wherein predicting the likelihood of the occurrence of the safety event comprises determining that the extension length exceeds or is less than an extension length associated with safe activity over the time period.

Example 14

The method of any of Examples 1-13, wherein generating the output comprises generating alert data that indicates that a safety event is likely.

Example 15

The method of any of Examples 1-14, further comprising generating a user interface based on the usage data, wherein the user interface indicates at least one of operation of the at least one SRL, safety events associated with the at least one SRL, or a geographic region in which the at least one SRL is deployed and at least one safety event has occurred or is likely to occur.

Example 16

A non-transitory computer-readable storage medium encoded with instructions that, when executed, cause at least one processor of a computing device to perform any of the method of Examples 1-15.

Example 17

An apparatus comprising means for performing any of the method of Examples 1-15.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:
a self-retracting lifeline (SRL) comprising one or more electronic sensors, the one or more electronic sensors configured to generate data that is indicative of an operation of the SRL; and
at least one computing device comprising one or more computer processors and a memory comprising instructions that when executed by the one or more computer processors cause the one or more computer processors to:
receive the data that is indicative of the operation of the SRL;
apply the data to a safety model stored in the memory, the safety model characterizing the activity of the SRL;
identify regions within a work environment in which the at least one SRL is deployed to predict, based on the identified regions being associated with a number of known safety events identified with an anomalous behavior of a user of the at least one SRL relative to known safe behavior characterized by the safety model, a likelihood of an occurrence of a safety event associated with the SRL; and
wirelessly send to the SRL a set of rules that are based on the safety model that predicts, based on the identification of regions within the work environment in which the self-retracting lifeline is deployed, the likelihood of the occurrence of the safety event associated with the SRL.

2. The system of claim 1, wherein the instructions that cause the one or more computer processors to perform the one or more operations the memory comprise instructions that when executed by the one or more computer processors cause the one or more computer processors to:
generate an alert in response to the predicted likelihood of the occurrence of the safety event; and
transmit the alert to the SRL,
wherein the SRL is configured to:
receive the alert; and
generate an output in response to receiving the alert.

3. The system of claim 1, further comprising a hub configured to communicate with the SRL and the at least one computing device, wherein the SRL is configured to transmit the usage data to the hub, and wherein the hub is configured to transmit the usage data to the at least one computing device.

4. The system of claim 1, wherein the at least one computing device is configured to transmit an alert to the SRL via a hub.

5. The system of claim 1, wherein the at least one computing device is further configured to:
generate the set of rules based on the safety model; and
transmit the rules to a hub that is configured to communicate with the SRL, and wherein the hub is configured to generate a second alert based on the set of rules.

6. A self-retracting lifeline (SRL) comprising:
a first connector configured to be coupled to an anchor;
a second connector configured to be coupled to a user of the lifeline;
one or more electronic sensors, the one or more electronic sensors configured to generate usage data that is indicative of an operation of the SRL;
a communication unit that is configured to:
wirelessly transmit the data that is indicative of the operation of the SRL to a second device; and
wirelessly receive a set of rules based on a safety model that predicts, based on identification of regions within a work environment in which the self-retracting lifeline is deployed as being associated with a number of known safety events identified with anomalous behavior of the user of the self-retracting lifeline relative to known safe behavior characterized by the safety model, a likelihood of an occurrence of a safety event associated with the SRL;
a memory configured to store the rules; and one or more user interface devices configured to communicate an output based on a comparison of the usage data to the rules.

7. The self-retracting lifeline of claim 6, wherein the communication unit is further configured to receive alert data based on application of the usage data to one or more safety models for predicting a likelihood of an occurrence of a safety event associated with the SRL, and wherein the self-retracting lifeline further comprises an output unit that is configured to generate the output based on the alert data.

8. The self-retracting lifeline of claim 6, wherein the one or more sensors comprise at least one of an extension sensor, a tension sensor, an accelerometer, a location sensor, or an altimeter.

9. The self-retracting lifeline of claim 6, further comprising one or more environment sensors configured to generate data indicative of an environment in which the self-retracting lifeline is located.

10. The self-retracting lifeline of claim 9, wherein the one or more environment sensors are configured to generate data indicative of at least one of temperature, barometric pressure, humidity, particulate content, or ambient noise.

11. A computing device comprising:
one or more computer processors; and
a memory comprising instructions that when executed by the one or more computer processors cause the one or more computer processors to:
obtain usage data from at least one self-retracting lifeline (SRL), wherein the usage data comprises data indicative of operation of the at least one SRL;
apply the usage data to a safety model stored in the memory, wherein the safety model characterizes activity of a user of the at least one SRL;
identify regions within a work environment in which the at least one SRL is deployed to predict, based on the identified regions being associated with a number of known safety events identified with an anomalous behavior of the user of the at least one SRL relative to known safe behavior characterized by the safety model, a likelihood of an occurrence of a safety event associated with the at least one SRL based on application of the usage data to the safety model; and
wirelessly send to the SRL a set of rules that are based on the safety model that predicts, based on the identification of regions within the work environment in which the self-retracting lifeline is deployed, the likelihood of the occurrence of the safety event associated with the SRL.

12. The computing device of claim 11, wherein the safety model is constructed from historical data of the known safety events from a plurality of SRLs having similar characteristics to the at least one SRL.

13. The computing device of claim 11, wherein the memory comprises instructions that when executed by the one or more computer processors cause the one or more computer processors to update the safety model based on the usage data from the at least one SRL.

14. The computing device of claim 11, wherein the memory comprises instructions that when executed by the one or more computer processors cause the one or more computer processors to construct the safety model from data of the known safety events from one or more devices other than SRLs that are in use with the at least one SRL.

15. The computing device of claim 11, wherein the memory comprises instructions that when executed by the one or more computer processors cause the one or more computer processors to select the safety model based on at least one of a configuration of the at least one SRL, the user of the at least one SRL, an environment in which the at least one SRL is located, or one or more other devices that are in use with the at least one SRL.

16. The computing device of claim 11, wherein the usage data is representative of activity of users of the at least one SRL during a time period, and wherein the usage data comprises data indicative of at least one of extension and retraction of a lifeline of the SRL, a force applied to the lifeline of the at least one SRL, an acceleration of the at least one SRL, a location of the at least one SRL, or an altitude of the at least one SRL.

17. The computing device of claim 11, wherein the usage data comprises environmental data associated with an environment in which the at least one SRL is located, such that the likelihood of the occurrence of the safety event is based on the environment in which the SRL is located.

18. The computing device of claim 11, wherein to apply the usage data to the safety model that characterizes activity of the user the memory comprises instructions that when executed by the one or more computer processors cause the one or more computer processors to apply the usage data to a safety model that is constructed from training data of known safety events associated with a plurality of SRLs.

19. The computing device of claim 11,
wherein the safety model further characterizes a speed of the user of the at least one SRL, and
wherein the instructions that cause the one more computer processors to predict the likelihood of the occurrence of the safety event comprise instructions that when executed by the one or more computer processors cause the one or more computer processors to determine that the speed of the user over a time period exceeds a speed associated with safe activity over the time period.

20. The computing device of claim 11,
wherein the safety model further characterizes a force applied to a lifeline of the at least one SRL by the user of the at least one SRL, and
wherein the instructions that cause the one more computer processors to predict the likelihood of the occurrence of the safety event comprise instructions that when executed by the one or more computer processors cause the one or more computer processors to determine that the force applied over a time period exceeds a force associated with safe activity over the time period.

21. The computing device of claim 11,
wherein the safety model further characterizes an extension length of a lifeline of the at least one SRL, and
wherein the instructions that cause the one more computer processors to predict the likelihood of the occurrence of the safety event comprise instructions that when executed by the one or more computer processors cause the one or more computer processors to determine that the extension length is outside of normal operating parameters associated with safe activity over a time period.

22. The computing device of claim 11, wherein the memory comprises instructions that when executed by the one or more computer processors cause the one or more computer processors to generate the output comprises generating alert data that indicates that the safety event is likely.

23. The computing device of claim 11, wherein the memory comprises instructions that when executed by the one or more computer processors cause the one or more computer processors to generate a user interface based on the usage data, wherein the user interface indicates at least one of operation of the at least one SRL, safety events associated with the at least one SRL, or a geographic region in which the at least one SRL is deployed and at least one safety event has occurred or is likely to occur.

24. The computing device of claim 11, wherein the number of known safety events is represented as a percentage of past events.

25. A computing device comprising:
one or more computer processors; and
a memory comprising instructions that when executed by the one or more computer processors cause the one or more computer processors to:
obtain usage data from at least one self-retracting lifeline (SRL), wherein the usage data comprises data indicative of operation of the at least one SRL;
apply the usage data to a safety model stored in the memory, the safety model characterizing a force applied to a lifeline of the at least one SRL by a user of the at least one SRL that characterizes activity of a user of the at least one SRL;
predict, based on identification of anomalous behavior of the user of the at least one SRL relative to known safe behavior characterized by the safety model, a likelihood of an occurrence of a safety event associated with the at least one SRL based on application of the usage data to the safety model and a determination that the force applied to the SRL over a time period exceeds a force associated with safe activity of the SRL over the time period; and
generate an output in response to predicting the likelihood of the occurrence of the safety event.

* * * * *